United States Patent
Fischbacher et al.

(10) Patent No.: US 11,122,297 B2
(45) Date of Patent: Sep. 14, 2021

(54) USING BORDER-ALIGNED BLOCK FUNCTIONS FOR IMAGE COMPRESSION

(71) Applicant: GOOGLE LLC, Mountain View, CA (US)

(72) Inventors: Thomas Fischbacher, Gattikon (CH); Lode Vandevenne, Rüschlikon (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/402,297

(22) Filed: May 3, 2019

(65) Prior Publication Data

US 2020/0351520 A1 Nov. 5, 2020

(51) Int. Cl.
*H04N 19/176* (2014.01)
*H04N 19/625* (2014.01)
*H04N 19/105* (2014.01)

(52) U.S. Cl.
CPC ......... *H04N 19/625* (2014.11); *H04N 19/105* (2014.11); *H04N 19/176* (2014.11)

(58) Field of Classification Search
CPC .. H04N 19/625; H04N 19/176; H04N 19/105; H04N 19/14; H04N 19/12
See application file for complete search history.

(56) References Cited

U.S. PATENT DOCUMENTS

| | | | |
|---|---|---|---|
| 4,774,574 A | 9/1988 | Daly et al. | |
| 5,068,724 A | 11/1991 | Krause et al. | |
| 5,091,782 A | 2/1992 | Krause et al. | |
| 5,121,216 A | 6/1992 | Chen et al. | |
| 5,146,324 A | 9/1992 | Miller et al. | |
| 5,224,062 A | 6/1993 | McMillan, Jr. et al. | |
| 5,235,623 A | 8/1993 | Sugiyama et al. | |
| 5,260,782 A | 11/1993 | Hui | |
| 5,274,442 A | 12/1993 | Murakami et al. | |
| 5,341,440 A | 8/1994 | Earl et al. | |
| 5,422,963 A | 6/1995 | Chen et al. | |
| 5,444,800 A | 8/1995 | Kim | |
| 5,635,938 A | 6/1997 | Komoto | |
| 5,737,020 A | 4/1998 | Hall et al. | |

(Continued)

FOREIGN PATENT DOCUMENTS

| | | |
|---|---|---|
| JP | 2010199959 A | 9/2010 |
| WO | 99018735 A1 | 4/1999 |

(Continued)

OTHER PUBLICATIONS

Bankoski et al. "Technical Overview of VP8, an Open Source Video Codec for the Web". Dated Jul. 11, 2011.

(Continued)

*Primary Examiner* — Shadan E Haghani
(74) *Attorney, Agent, or Firm* — Young Basile Hanlon & MacFarlane, P.C.

(57) ABSTRACT

A method for encoding a block of a frame. The method includes receiving the block that is in the spatial domain; selecting, based on a border that crosses the block, a set of basis functions for transforming the block to a transform domain; transforming the block using the set of basis functions to obtain a transform block; encoding, in a compressed bitstream, an indication of the set of basis functions; and encoding, in the compressed bitstream, the transform block.

20 Claims, 16 Drawing Sheets

(56) References Cited

U.S. PATENT DOCUMENTS

| | | | |
|---|---|---|---|
| 5,764,805 A | 6/1998 | Martucci et al. |
| 5,767,908 A | 6/1998 | Choi |
| 5,872,866 A | 2/1999 | Strongin et al. |
| 5,903,669 A | 5/1999 | Hirabayashi |
| 6,108,383 A | 8/2000 | Miller et al. |
| 6,115,501 A | 9/2000 | Chun et al. |
| 6,134,350 A | 10/2000 | Beck |
| 6,167,161 A | 12/2000 | Oami |
| 6,408,025 B1 | 6/2002 | Kaup |
| 6,522,783 B1 | 2/2003 | Zeng et al. |
| 6,522,784 B1 | 2/2003 | Zlotnick |
| 6,683,991 B1 | 1/2004 | Andrew et al. |
| 6,819,793 B1 | 11/2004 | Reshetov et al. |
| 6,917,651 B1 | 7/2005 | Yoo et al. |
| 6,934,419 B2 | 8/2005 | Zlotnick |
| 7,082,221 B1 | 7/2006 | Jiang |
| 7,266,149 B2 | 9/2007 | Holcomb et al. |
| 7,292,634 B2 | 11/2007 | Yamamoto et al. |
| 7,409,099 B1 | 8/2008 | Ameres et al. |
| 7,492,823 B2 | 2/2009 | Lee et al. |
| 7,894,530 B2 | 2/2011 | Gordon et al. |
| 7,912,318 B2 | 3/2011 | Nakayama |
| 7,936,820 B2 | 5/2011 | Watanabe et al. |
| 8,000,546 B2 | 8/2011 | Yang et al. |
| 8,094,950 B2 | 1/2012 | Sasagawa |
| 8,116,374 B2 | 2/2012 | Gordon et al. |
| 8,494,290 B2 | 7/2013 | Cohen et al. |
| 8,582,656 B2 | 11/2013 | Lin et al. |
| 8,687,699 B1 | 4/2014 | Wen |
| 8,885,701 B2 | 11/2014 | Saxena et al. |
| 9,106,933 B1 | 8/2015 | Bankoski et al. |
| 9,219,915 B1 | 12/2015 | Bultje et al. |
| 9,565,451 B1 | 2/2017 | Mukherjee et al. |
| 10,257,543 B2 * | 4/2019 | Guo ................... H04N 19/159 |
| 10,356,420 B2 * | 7/2019 | Rusanovskyy ......... G06T 7/162 |
| 2002/0168114 A1 | 11/2002 | Valente |
| 2002/0196983 A1 | 12/2002 | Kobayashi |
| 2003/0048943 A1 | 3/2003 | Ishikawa |
| 2003/0146925 A1 | 8/2003 | Zhao et al. |
| 2004/0057519 A1 | 3/2004 | Yamamoto et al. |
| 2004/0125204 A1 | 7/2004 | Yamada et al. |
| 2004/0184537 A1 | 9/2004 | Geiger et al. |
| 2005/0025246 A1 | 2/2005 | Holcomb |
| 2005/0053151 A1 | 3/2005 | Lin et al. |
| 2005/0147163 A1 | 7/2005 | Li et al. |
| 2005/0249291 A1 | 11/2005 | Gordon et al. |
| 2006/0045368 A1 | 3/2006 | Mehrotra |
| 2006/0098738 A1 | 5/2006 | Cosman et al. |
| 2006/0115168 A1 | 6/2006 | Kobayashi |
| 2006/0133682 A1 | 6/2006 | Tu et al. |
| 2006/0210181 A1 | 9/2006 | Wu et al. |
| 2006/0239575 A1 | 10/2006 | Abe et al. |
| 2006/0251330 A1 | 11/2006 | Toth et al. |
| 2007/0036223 A1 | 2/2007 | Srinivasan |
| 2007/0078661 A1 | 4/2007 | Sriram et al. |
| 2007/0140349 A1 | 6/2007 | Burazerovic |
| 2007/0183500 A1 | 8/2007 | Nagaraj et al. |
| 2007/0201554 A1 | 8/2007 | Sihn |
| 2007/0211953 A1 | 9/2007 | Sasagawa |
| 2007/0223583 A1 | 9/2007 | Nagai et al. |
| 2008/0008246 A1 | 1/2008 | Mukherjee et al. |
| 2008/0043848 A1 | 2/2008 | Kuhn |
| 2008/0084929 A1 | 4/2008 | Li |
| 2008/0123736 A1 | 5/2008 | Sekiguchi et al. |
| 2008/0123947 A1 | 5/2008 | Moriya et al. |
| 2008/0123977 A1 | 5/2008 | Moriya et al. |
| 2008/0253463 A1 | 10/2008 | Lin et al. |
| 2008/0310512 A1 | 12/2008 | Ye et al. |
| 2009/0041128 A1 | 2/2009 | Howard |
| 2009/0049641 A1 | 2/2009 | Pullins et al. |
| 2009/0067503 A1 | 3/2009 | Jeong et al. |
| 2009/0122864 A1 | 5/2009 | Palfner et al. |
| 2009/0123066 A1 | 5/2009 | Moriya et al. |
| 2009/0228290 A1 | 9/2009 | Chen et al. |
| 2009/0274382 A1 | 11/2009 | Lin et al. |
| 2010/0020867 A1 | 1/2010 | Wiegand et al. |
| 2010/0086049 A1 | 4/2010 | Ye et al. |
| 2010/0246951 A1 | 9/2010 | Chen et al. |
| 2010/0290520 A1 | 11/2010 | Kamisli et al. |
| 2010/0309286 A1 | 12/2010 | Chen et al. |
| 2011/0032983 A1 | 2/2011 | Sezer |
| 2011/0090959 A1 | 4/2011 | Wiegand et al. |
| 2011/0182352 A1 | 7/2011 | Pace |
| 2011/0206135 A1 | 8/2011 | Drugeon et al. |
| 2011/0243249 A1 | 10/2011 | Lee et al. |
| 2011/0268183 A1 | 11/2011 | Sole et al. |
| 2011/0274162 A1 | 11/2011 | Zhou et al. |
| 2011/0286516 A1 | 11/2011 | Lim et al. |
| 2011/0293009 A1 | 12/2011 | Steinberg et al. |
| 2011/0293012 A1 | 12/2011 | Au et al. |
| 2012/0008682 A1 * | 1/2012 | Karczewicz ........... H04N 19/14 375/240.12 |
| 2012/0008683 A1 | 1/2012 | Karczewicz et al. |
| 2012/0057360 A1 | 3/2012 | Swan |
| 2012/0057630 A1 | 3/2012 | Saxena et al. |
| 2012/0128066 A1 | 5/2012 | Shibahara et al. |
| 2012/0162455 A1 | 6/2012 | Kim et al. |
| 2012/0170649 A1 | 7/2012 | Chen et al. |
| 2012/0177116 A1 | 7/2012 | Panusopone et al. |
| 2012/0195378 A1 | 8/2012 | Zheng et al. |
| 2012/0201298 A1 | 8/2012 | Panusopone et al. |
| 2012/0230411 A1 | 9/2012 | Liu et al. |
| 2012/0230418 A1 | 9/2012 | Sole Rojals et al. |
| 2012/0308128 A1 | 12/2012 | Oosake |
| 2013/0003824 A1 | 1/2013 | Guo et al. |
| 2013/0003828 A1 | 1/2013 | Cohen et al. |
| 2013/0003859 A1 | 1/2013 | Karczewicz et al. |
| 2013/0022107 A1 | 1/2013 | Van der Auwera et al. |
| 2013/0034152 A1 | 2/2013 | Song et al. |
| 2013/0034169 A1 | 2/2013 | Sadafale et al. |
| 2013/0070845 A1 | 3/2013 | Lim et al. |
| 2013/0089138 A1 | 4/2013 | Guo et al. |
| 2013/0089145 A1 | 4/2013 | Guo et al. |
| 2013/0114730 A1 | 5/2013 | Joshi et al. |
| 2013/0128974 A1 | 5/2013 | Chien et al. |
| 2013/0136175 A1 | 5/2013 | Wang et al. |
| 2013/0156328 A1 | 6/2013 | Wang et al. |
| 2013/0176211 A1 | 7/2013 | Inada et al. |
| 2013/0243083 A1 | 9/2013 | Sezer |
| 2013/0272422 A1 | 10/2013 | Lee et al. |
| 2013/0315303 A1 | 11/2013 | Min et al. |
| 2013/0336410 A1 | 12/2013 | Nguyen et al. |
| 2014/0010295 A1 | 1/2014 | Lu et al. |
| 2014/0086314 A1 | 3/2014 | Hebei et al. |
| 2014/0092956 A1 | 4/2014 | Panusopone et al. |
| 2014/0204999 A1 | 7/2014 | Park et al. |
| 2014/0247872 A1 * | 9/2014 | Merkle ................ H04N 19/105 375/240.12 |
| 2018/0338143 A1 * | 11/2018 | Fracastoro ........... H04N 19/139 |

FOREIGN PATENT DOCUMENTS

| | | |
|---|---|---|
| WO | 2010039015 A2 | 4/2010 |
| WO | 2010039288 A1 | 4/2010 |
| WO | 2011049399 A2 | 4/2011 |
| WO | 2012005099 A1 | 1/2012 |
| WO | 2012166959 A1 | 12/2012 |
| WO | 2014031544 A1 | 2/2014 |
| WO | 2014075552 A1 | 5/2014 |
| WO | 2014078703 A1 | 5/2014 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Bross, B, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.

(56) References Cited

OTHER PUBLICATIONS

Bross, B, H. Kirchofter, H. Schwarz, T. Wiegand,"Fast intra encoding for fixed maximum depth of transform quadtree," JCTVC-C311_r1 , Guangzhou, CN, Oct. 2010.
Chen J. et al "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http:/wftp3.itu.int/av-arch/jctvc-site/, No. JCTVC-K0035, Oct. 2, 2012, all pages.
Chen J. et al., "TE:Simulation results for various max number of transform quadtree depth," MPEG Meeting, Guangzhou, Chima; No. M18236; Oct. 28, 2010.
Chen P. et al., "Video coding using extended block sizes," VCEG Meeting, San Diego, US; No. VCEG-AJ23, Oct. 15, 2008.
Chen, Y, J. Han, T. Nanjundaswamy, and K. Rose, "A joint spatiotemporal filtering approach to efficient prediction in video compression," Picture Coding Symposium, 2013.
Guo L et al.: "Transform Selection for Inter-Layer Texture Prediction in Scalable Video Coding", 11. JCT-VC Meeting; 102; MPEG Meeting; Oct. 10-19, 2012; Shanghai; (Joint Collaborative Team on Video Coding of ISO/IEC JTC1/WG11 and ITU-T SG.16); URL:http://wftp3.itu.int/av-arch/jctvc-site/,, No. JCTVC-K0321, Oct. 7, 2012, all pages.
Han et al., "Jointly Optimized Spatial Prediction and Block Transform for Video and Image Coding," IEEE Transactions on Image Processing, vol. 21, No. 4 (Apr. 2012).
Han et al., "Toward Jointly Optimal Spatial Prediction and Adaptive Transform in Video/Image Coding," ICASSP 2010 (Dallas, TX, Mar. 14-19, 2010).
Krit Panusopone et al., "Flexible Picture Partitioning", JCT-VC (Joint Collaborative Team on Video Coding) JCTVC-C260, Meeting, Oct. 7-15, 2010.
Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.
Lee B. et al., "Hierarchical variable block transform," JCT-VC Meeting, Geneva, Switzerland; No. JCTVC-B050; Jul. 24, 2010.
Lee T et al.: "TE12.1: Experimental results of transform unit quadtree/2-level test", 3 JCT-VC Meeting; 94. MPEG Meeting; Oct. 7-15, 2010; Guangzhou; (Joint Collaborative Team on Video Coding of ISO/IEC JTC1/SC29/WG11 and ITU-T SG.16); URL:http://wtfp3.itu.int/av-arch/jctvc-site/,, No. JCTVC-C200, Oct. 2, 2010, all pages.
McCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; JCTVC124; 42 pages.
McCann K. et al.; "Video coding technology proposal by samsung (and BBC)," JCT-VC Meeting; Dresden, Germany, Apr. 15, 2010.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Saxena A et al.: "On secondary transforms for intra/inter prediction residual", 9. JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16); URL:http:/wftp3.itu.int/av-arch/jctvc-site/,, No. JCTVC-I0232, Apr. 17, 2012, all pages.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
Sikora, T. et al, Shape-adaptive DCT for generic coding of video, Circuits and Systems for Video Technology, IEEE Transactions on vol. 5, Issue 1, p. 59-62, Feb. 1, 1995.
VP6 Bitstream and Decoder Specification, Version 1.03, (On2 Technologies, Inc.), Dated Oct. 29, 2007.
Wiegand et al, "Overview of the H 264/AVC Video Coding Standard," IEEE Transactions on Circuits and Systems for Video Technology, vol. 13, No. 7, pp. 568, 569, Jul. 1, 2003.
Wiegand et al. "BoG report: residual quadtree structure" JCTVC-C319_r1, Guangzhou, CN Oct. 2010.
Wiegand, T; B. Bross, J. Ohm, G. Sullivan, "WD1: Working Draft 1 of High-Efficiency Video Coding," JCTVC-C403, Guangzhou, CN, Oct. 7-15, 2010.
Xin, J., K. N. Ngan, and G. Zhu, "Combined inter-intra prediction for high definition video coding," Picture Coding Symposium, 2007.
International Preliminary Report and Written Opinion of the International Searching Authority for International Application No. PCT/US2013062216 dated Mar. 31, 2015.
Saxena A et al.: "On secondary transforms for Intra BVL residue", 13. JCT-VC Meeting; 104. MPEG Meeting; Apr. 18-26, 2013; IncHEON; (Joint Collaborative Team on Video Coding of ISO/IEC JTC1/SC29/WG11 and ITU-T SG.16); URL:http://wftp3.itu.int/av-arch/jctvc-site/, No. JCTVC-M0033, Apr. 9, 2013, all pages.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Park et al.; "Accurate Image Rotation using Hermite Expansions" IEEE Trans Image Process. Sep. 2009; 18(9):1988-2003.
Aguiar et al.; "Maximizing compression efficiency through block rotation"; https://www.researchgate.net/publication/268452118; Nov. 2014.

* cited by examiner

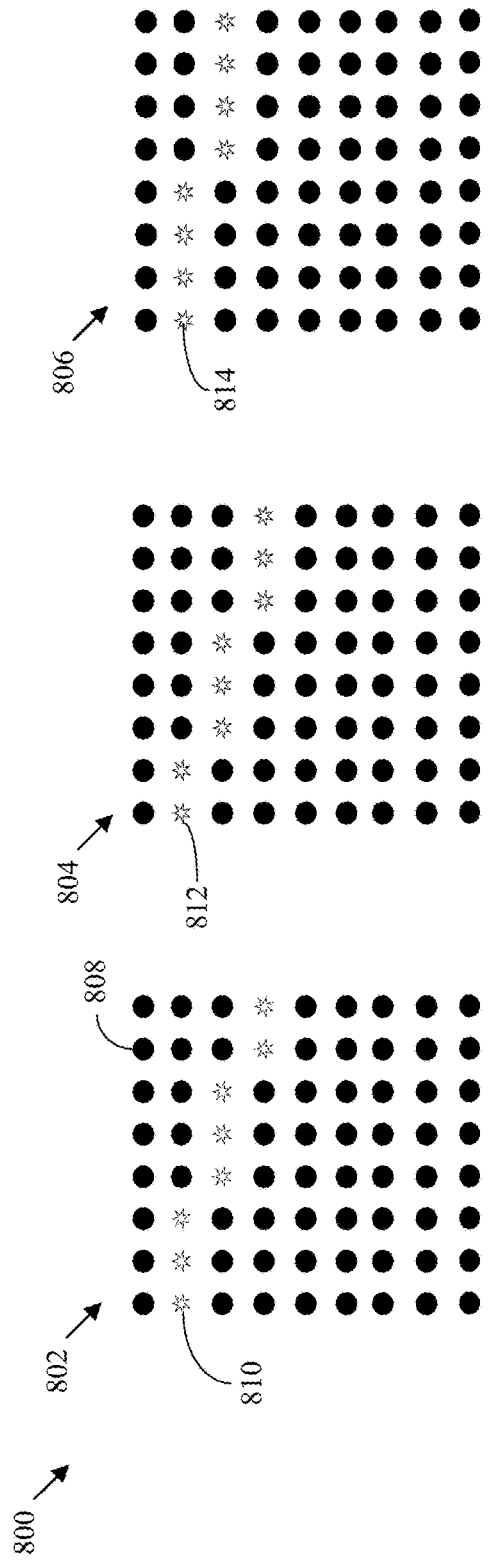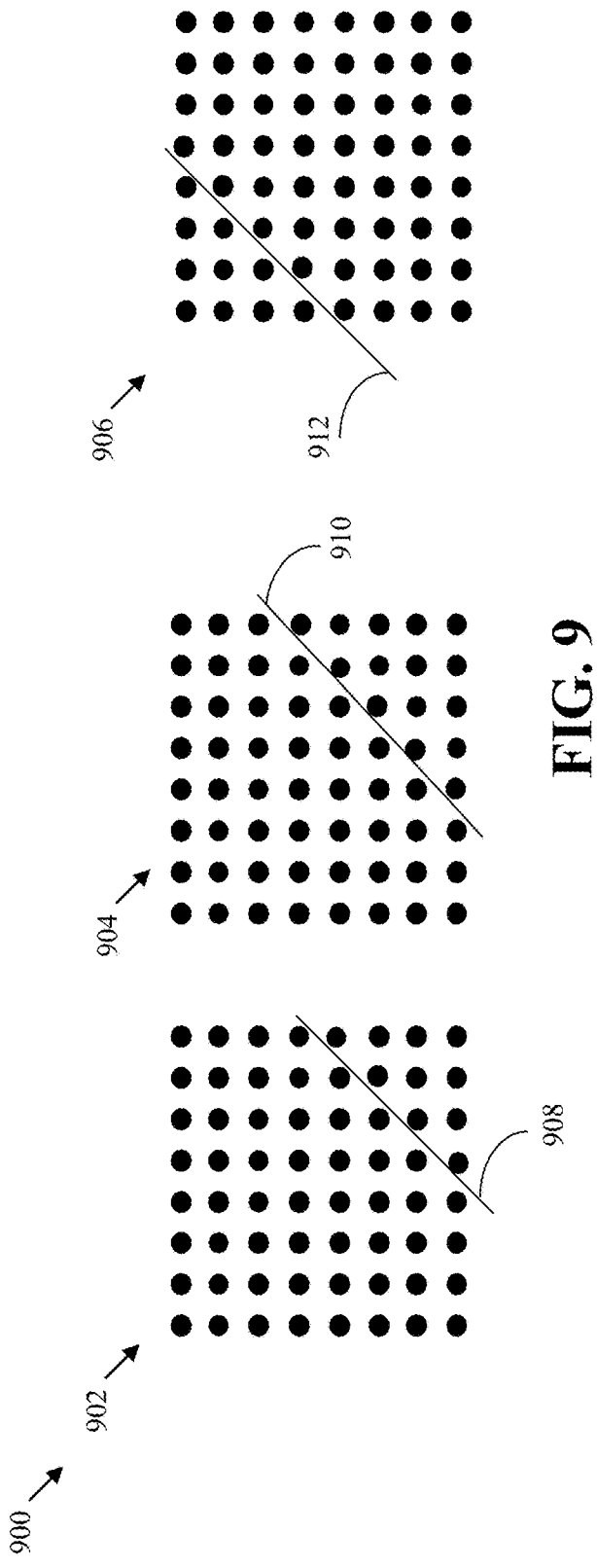

USING BORDER-ALIGNED BLOCK FUNCTIONS FOR IMAGE COMPRESSION

BACKGROUND

Image content (e.g., still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artefacts, such as ringing artefacts, into the decompressed image. Higher compression levels can result in more observable ringing artefacts. It is desirable to minimize the ringing artefacts while maintaining high levels of compression.

SUMMARY

One aspect of this disclosure is a method for encoding a block of a frame. The method includes receiving the block that is in the spatial domain; selecting, based on a border that crosses the block, a set of basis functions for transforming the block to a transform domain; transforming the block using the set of basis functions to obtain a transform block; encoding, in a compressed bitstream, an indication of the set of basis functions; and encoding, in the compressed bitstream, the transform block.

Another aspect is an apparatus for encoding a block of a frame. The apparatus includes a processor and a memory. The memory includes instructions executable by the processor to receive the block, which is in the spatial domain; select, based on a shape that partitions the block, a set of basis functions for transforming the block to a transform domain; transform the block using the set of basis functions to obtain a transform block; encode, in a compressed bitstream, an indication of the set of basis functions; and encode, in the compressed bitstream, the transform block.

Another aspect is an apparatus for decoding a block of a frame. The apparatus includes a processor and a memory. The memory includes instructions executable by the processor to decode, from a compressed bitstream, an indication of a set of basis functions for inverse transforming the block, where the block includes a shape, the set of basis functions corresponds to the shape; and the set of basis functions corresponds to eigenfunctions of a graph Laplacian that is formed based on the shape; decode, from the compressed bitstream, a transform block; and inverse-transform the transform block using the set of basis functions to obtain the block.

These and other aspects of the present disclosure are disclosed in the following detailed description of the embodiments, the appended claims, and the accompanying figures.

BRIEF DESCRIPTION OF THE DRAWINGS

FIG. 8 illustrates an example of lines crossing a block at different angles according to implementations of this disclosure.

FIG. 9 illustrates an example of lines crossing a block at different translational shifts according to implementations of this disclosure.

DETAILED DESCRIPTION

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to the quantizing of frequency domain information (as further described below).

Lossy compression aims to describe (i.e., code, compress, etc.) an image with the least number of bits while preserving, as much as possible, the quality of the image when the compressed image is decompressed. That is, lossy compression techniques seek to compress an image without degrading the quality of the image beyond an unacceptable level that would be perceivable, for example, by the human eye.

Traditional lossy image compression methods, such as JPEG, break an image into blocks. The blocks can be of size 8×8. However, other sizes are possible. The image data (which can also be referred to as the pixel values, the pixel domain data, or the spatial domain data) in each such block can then be re-expressed in a function basis that separates contributions with slow spatial variation from contributions with fast spatial variation. In this new form (which can also be referred to as the frequency domain or the transform domain), it then becomes possible to perform visually lossless data reduction by discretizing spatial variations in a way that cannot be perceived by the human eye under normal viewing conditions of the image.

Figure 6:
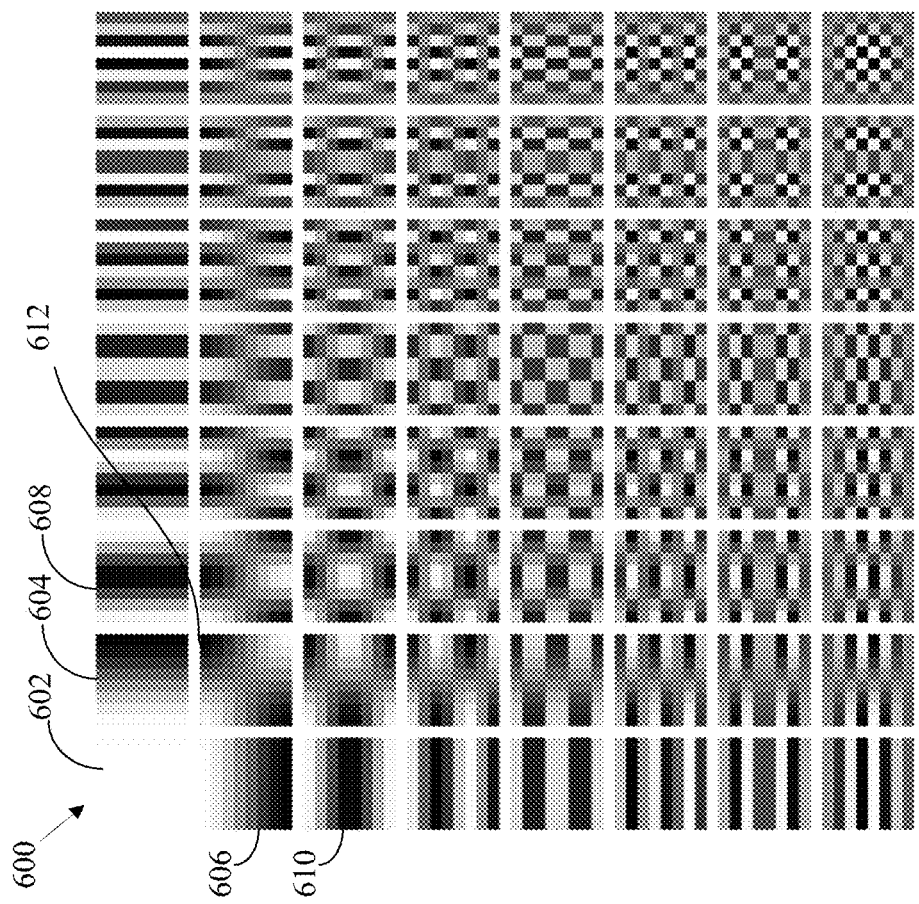
FIG. 6 illustrates the DCT-II basis functions that are used in JPEG image compression.

As is known, a frequency-based transform, such as the Discrete Cosine Transform (DCT) can be used to re-express (e.g., transform) the spatial domain data to the frequency domain. FIG. 6, which is further described below, illustrates the basis functions 600 of the DCT-II transform that are used in JPEG image compression.

In some situations, the approach described above (e.g., the use of DCT basis functions) can produce undesirable artefacts, such as ringing artefacts, which appear at sharp transitions in an image. A shape (such as a sharp boundary, a line, a border, etc.) may partition one or more blocks of an image into distinct areas. For example, a pole that casts a sharp shadow on a pavement can divide at least some blocks of the image into shadow areas and sunny areas. For example, a wall that blocks a view of the sky in an image divides at least one block of the image into a portion that includes a portion of the wall and another portion that includes a portion of the sky. Such 'occlusion boundaries' are a very common phenomenon in images.

Ringing artefacts can result from compressing high frequency signals. Ringing artefacts may appear as bands and/or ghosts near edges of objects in a decompressed image. The ringing artefacts are due to undershoots and overshoots around edges. "Undershoot" means that a value of a pixel in the decompressed image is less than the value of the same pixel in the source image. That is, "undershoot" can mean that pixels around the edges (e.g., the borders or edges of shapes that partition a block) are de-emphasized. "Overshoot" means that a value of a pixel in the decompressed image is greater than the value of the same pixel in the source image. That is, "overshoot" can mean that some pixels around the edges are accentuated. That is, as a result of the lossy compression, some parts of a bright (dark) background can become even brighter (darker) in the decompressed image.

Overshoots and undershoots can result from frequency-domain sinc-type oscillations. For example, in an image that includes a bright (dark) background that is partially occluded by a dark (bright) foreground object, a step-like function exists at the edge of the background and the foreground object. If the edge is compressed based on a frequency-based transform, increased levels of quantization result in the sinc-type oscillations at the proximity of the edge due to the frequency-limiting properties of quantization. As mentioned, undershoots and overshoots can be observed around edges. To suppress the ringing around a boundary (e.g., a border, a line) in a block, more coefficients (i.e., transform coefficients) are required to be added or retained in a transform block thereby resulting in more bits expended (i.e., to encode the additional transform coefficients).

Implementations according to this disclosure can reduce ringing and other artefacts attributable to shapes, such as a sharp straight boundary, running through image blocks. Described herein is a scheme for coding (encoding and decoding) spatial variations for an image block that includes a shape (e.g., a sharp straight boundary) running through the image block. Additionally, the scheme described herein results in the selection of a set of basis functions so that bits (e.g., for additional transform coefficients) are not expended to suppress ringing in a part of a block.

As contrasted with, for example, DCT, which uses a fixed set of basis functions for transforming the block, the scheme described herein selects, for transforming a block, a set of basis functions such that the set of basis functions is based on the shape that runs through the block. For ease of explanation, a line (e.g., an edge, a border) is used as the shape that runs through the block. However, the disclosure herein is not limited to shapes that are lines. By using a set of basis functions that is based on the border, the number of non-zero coefficients in the transform block can be reduced and the ringing artefacts can be reduced.

A compression density of 2 bits per pixel is not atypical to obtain good compression quality for blocks with interesting structures. That is, to encode the visual content of an 8×8 block, on average, 128 bits may be required. In implementations according to this disclosure where, for example, 64 sets of basis functions are used, only 6 (i.e., log 2(64)=6) bits, on average, may be required to select (e.g., identify) the set of basis functions, which is small fraction of the 128 bits; and, as further explained below, not many bits are required for transform coefficient coding. Other schemes use more bits, as compared to the schemes described herein, for transform coefficient coding where such bits do not carry actual image content. Instead, such bits may be required to suppress (or reduce) ringing that is due to sharp changes in contrast. As such, in implementations according to this disclosure, in addition to the reduction in bits, ringing can be significantly reduced thereby improving quality.

A set of candidate sets of basis functions can be available. For ease of reference, "a candidate set of basis functions" is simply referred to as "candidate functions" or "a candidate set." A candidate set is selected for encoding a block. The candidate set that is selected can depend on the direction of the border that crosses the block, where the border crosses the block, or a combination thereof. In some implementations, and as further described below, a first candidate set can be related (and derived from) a second candidate set using at least one of rotation, mirroring, or similar operations. Additionally, a "set of basis functions" is also referred to as a "function-set" or a "function set."

Details of using border-aligned block functions for image compression are described herein with initial reference to a system in which the teachings herein can be implemented.

Figure 1:
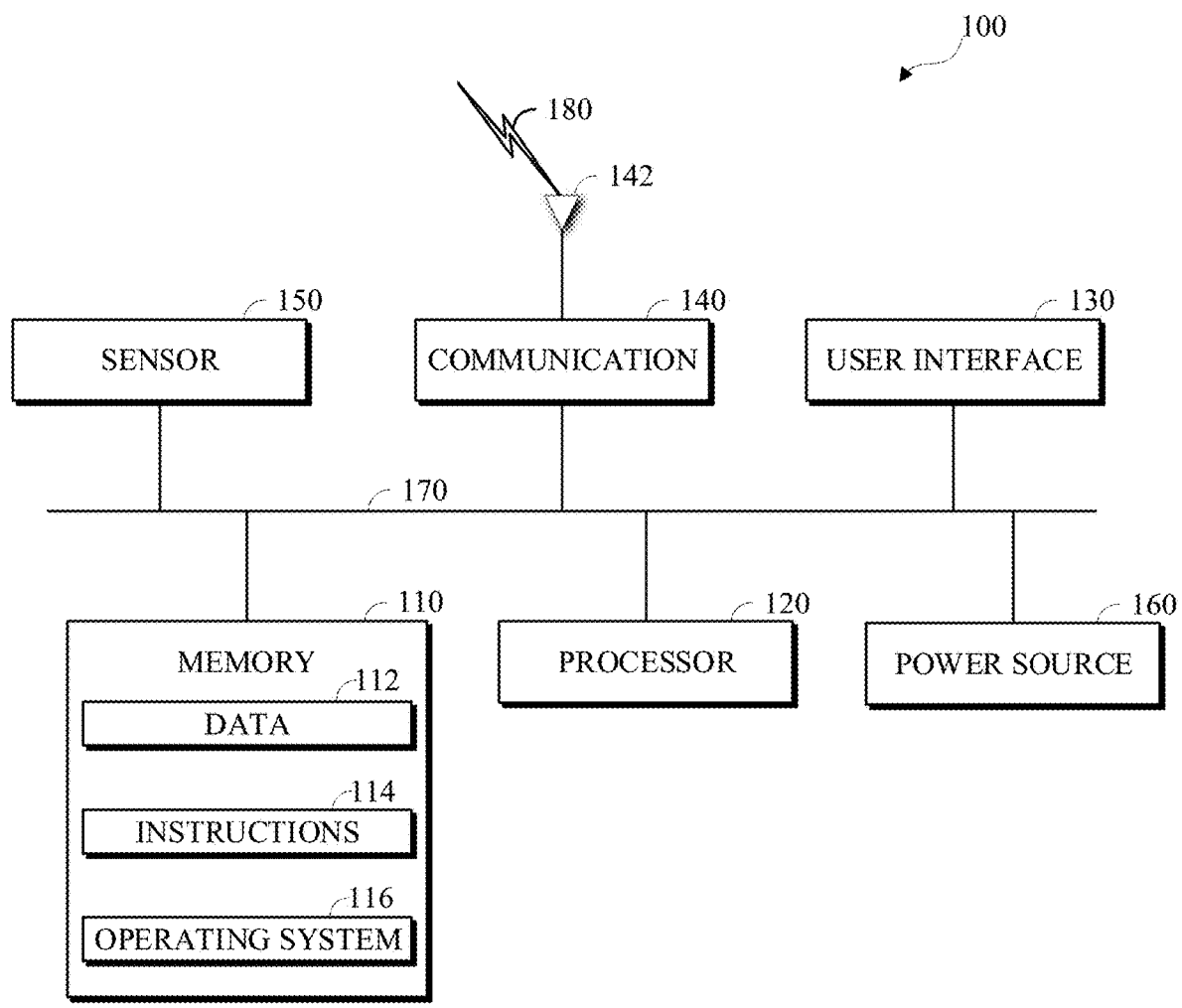
FIG. 1 is a diagram of a computing device in accordance with implementations of this disclosure.

FIG. 1 is a diagram of a computing device 100 (e.g., an apparatus) in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated in any number of separate physical units. For example, the user interface 130 and processor 120 can be integrated in a first physical unit, and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuit (ASIC), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special-purpose processor, or circuitry, that can include specialized hardware for carrying out any of the methods, algorithms, aspects, or combinations thereof, as described herein. Portions of the instructions 114 can be distributed across multiple processors on the same machine or different machines or across a network, such as a local area network, a wide area network, the Internet, or a combination thereof.

The processor 120 can include any device or system, now-existing or hereafter developed, capable of manipulating or processing a digital signal or other electronic information, including optical processors, quantum processors, molecular processors, or a combination thereof. For example, the processor 120 can include a special-purpose processor, a central processing unit (CPU), a digital signal processor (DSP), a plurality of microprocessors, one or more microprocessors in association with a DSP core, a controller, a microcontroller, an Application Specific Integrated Circuit (ASIC), a Field Programmable Gate Array (FPGA), a programmable logic array, a programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber-optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion-sensing device, or a combination thereof. For example, the sensor 150 may include a sound-sensing device, such as a microphone, or any other sound-sensing device, now existing or hereafter developed, that can sense sounds in the proximity of the computing device 100, such as speech or other utterances, made by a user operating the computing device 100. In another example, the sensor 150 may include a camera, or any other image-sensing device, now existing or hereafter developed, that can sense an image, such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160 may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof, can be integrated in one or more electronic units, circuits, or chips.

Figure 2:
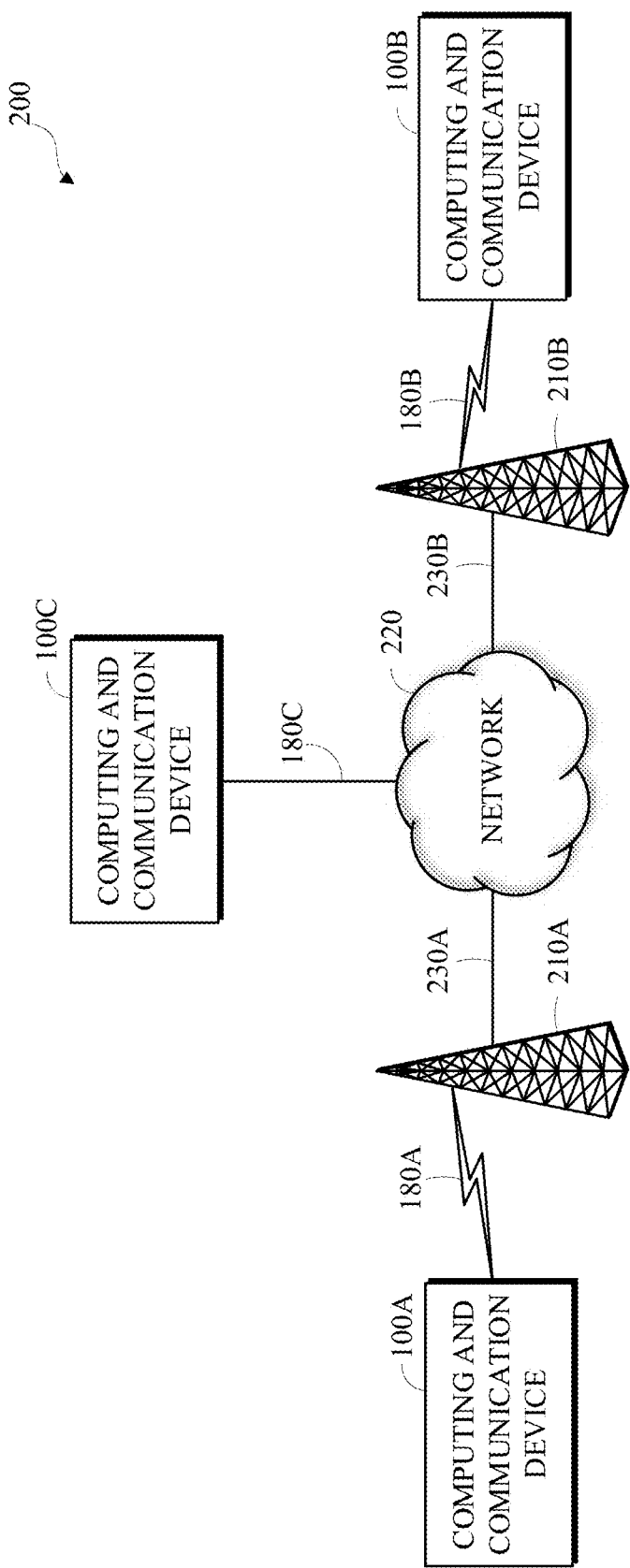
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communications system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, or 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof, audio data; and one or both of the computing and communication device 100A and the computing and communication device 100B may receive, decode, process, store, present, or a combination thereof, the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication devices 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the Transmission Control Protocol (TCP), the User Datagram Protocol (UDP), the Internet Protocol (IP), the Real-time Transport Protocol (RTP), the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown, the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
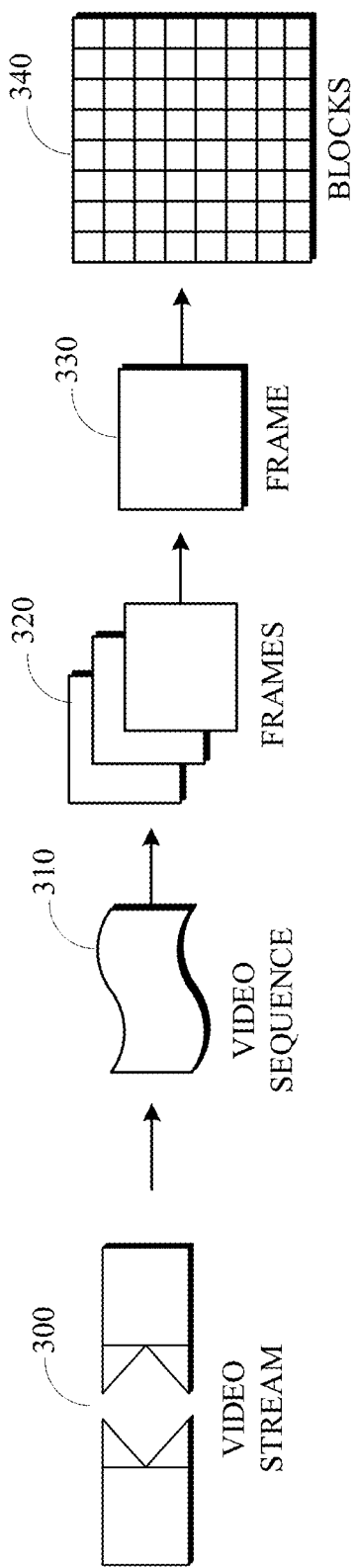
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term "block" can include a superblock, a macroblock, a segment, a slice, or any other portion of a frame. A frame, a block, a pixel, or a combination thereof, can include display information, such as luminance information, chrominance information, or any other information that can be used to store, modify, communicate, or display the video stream or a portion thereof.

In some implementations, a frame that is not part of a video stream is encoded and decoded in accordance with implementations of this disclosure.

Figure 4:
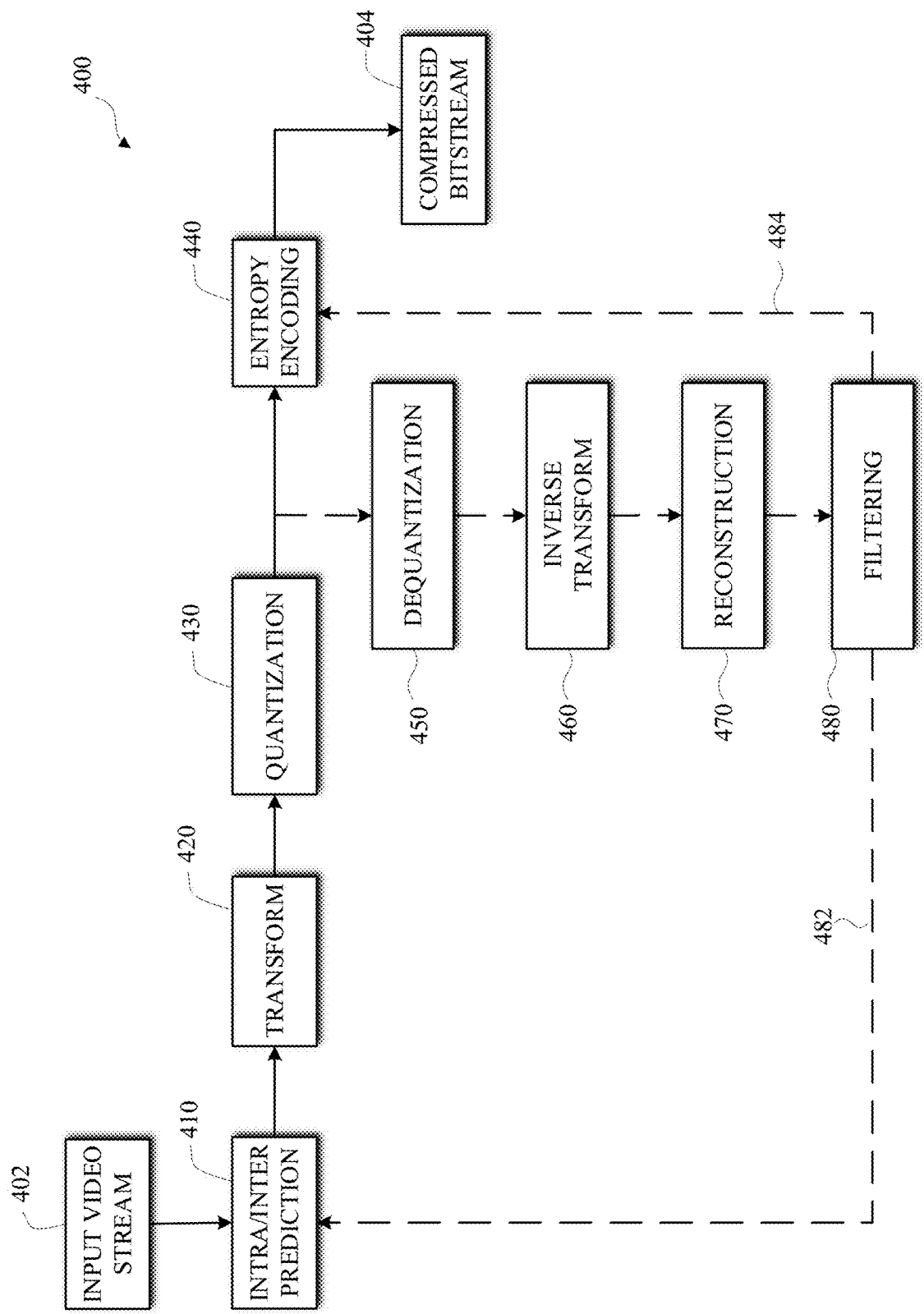
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to encode video data as described herein. The encoder 400 can be implemented as specialized hardware included, for example, in the computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The input video stream 402 can be a single image or a collection of images.

The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), the Fourier transform (FT), the Discrete Sine Transform (DST), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
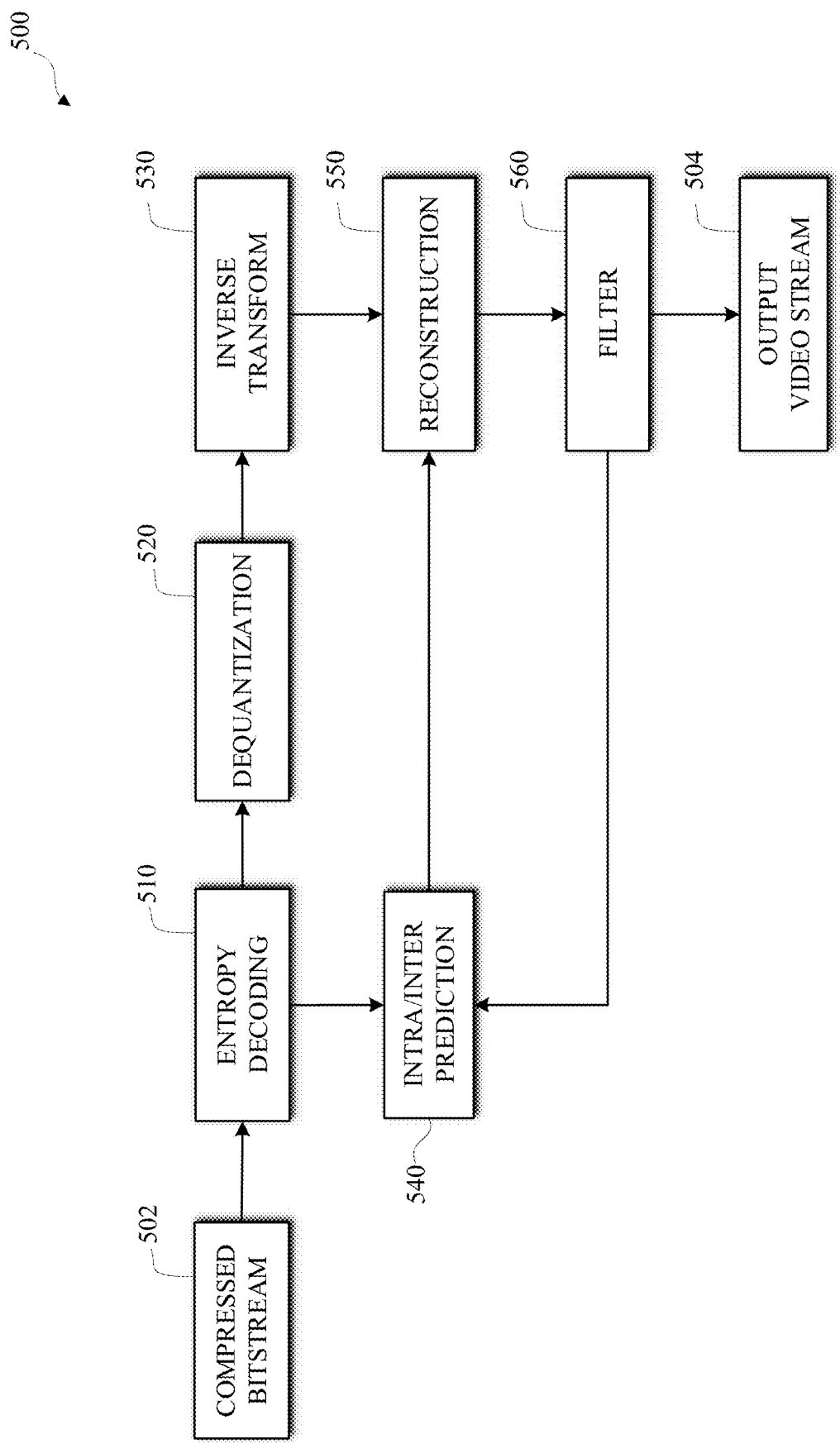
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artefacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to decode video data as described herein. The decoder 500 can be implemented as specialized hardware included, for example, in the computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artefacts, such as blocking artefacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

FIG. 6 illustrates the basis functions 600 that are used in JPEG image compression. As is known, given a block A of pixel values, where A is of size M×N, a transform block, T, can be generated using the formula:

$$T_{pq} = a_p a_q \sum_{m=0}^{M-1} \sum_{n=0}^{N-1} A_{mn} \cos\frac{\pi(2m+1)p}{2M} \cos\frac{\pi(2n+1)q}{2N}$$

$$a_p = \begin{cases} 1/\sqrt{M}, p=0 \\ \sqrt{2/M}, 1 \le p \le M-1 \end{cases} \quad a_q = \begin{cases} 1/\sqrt{N}, q=0 \\ \sqrt{2/N}, 1 \le q \le N-1 \end{cases}$$

In the above formula, $T_{pq}$ are the DCT (i.e., transform) coefficients of the block A. The basis functions 600 are defined on 64 points (i.e., on an 8×8 grid). However, the block size (and, therefore, the corresponding basis functions) need not be 8×8. For example, if the image block is of size M×N (e.g., 12×12), then there will be M*N (e.g., 12*12=144) basis functions and, correspondingly, M*N transform coefficients in the transform block. The very first basis function, a function 602, is a constant function. The function 602, when multiplied by a coefficient value (also known as the DC coefficient), can be interpreted as the average brightness of that block. The other DCT basis functions of the basis functions 600, add corrections (positive or negative corrections) to the average value. For example, basis functions 604 and 606 provide approximation (i.e., corrections) of the vertical brightness variation and horizontal brightness variation, respectively. Basis function 608, 610, 612 provide the next level of correction. The basis function 608, 610, 612 provide diagonal brightness variation as well as faster brightness variation that doesn't simply cycle from bright to dark over the width of one block or the height of one block, rather the brightness variation also cycles from bright to dark to bright again.

The DCT transformation is premised on the fact that brightness for many images doesn't vary rapidly from pixel to pixel. As such, an image is not merely a random noise of brightness (i.e., unrelated pixel values); rather, there is assumed to be a strong correlation between the brightness of one pixel and the brightness of an adjacent pixel. The DCT basis functions take the correlation into account. Typically, smoother variations are retained, and the spatial fast variation are discarded. Fast spatial variations correspond to the high frequency components, which are toward the bottom and the right of the basis functions 600.

The basis functions 600 can be characterized as solutions to an eigenvalue problem; namely, the problem of finding eigenfunctions of a discretized Laplace operator given specific boundary conditions. The specific boundary conditions can be the "open" (i.e., Neumann) boundary conditions. Such an intuition can be used as the basis of the candidate sets of basis functions described herein. In other implementations, other (e.g., non-open) boundary conditions can be used. Such other boundary conditions can result in other basis functions. Non-open boundary conditions may be more difficult to implement and may require that the image block be cut along at least a second, fictitious border, which may be mostly independent of the type of boundary conditions at the block-boundaries.

Figure 7:
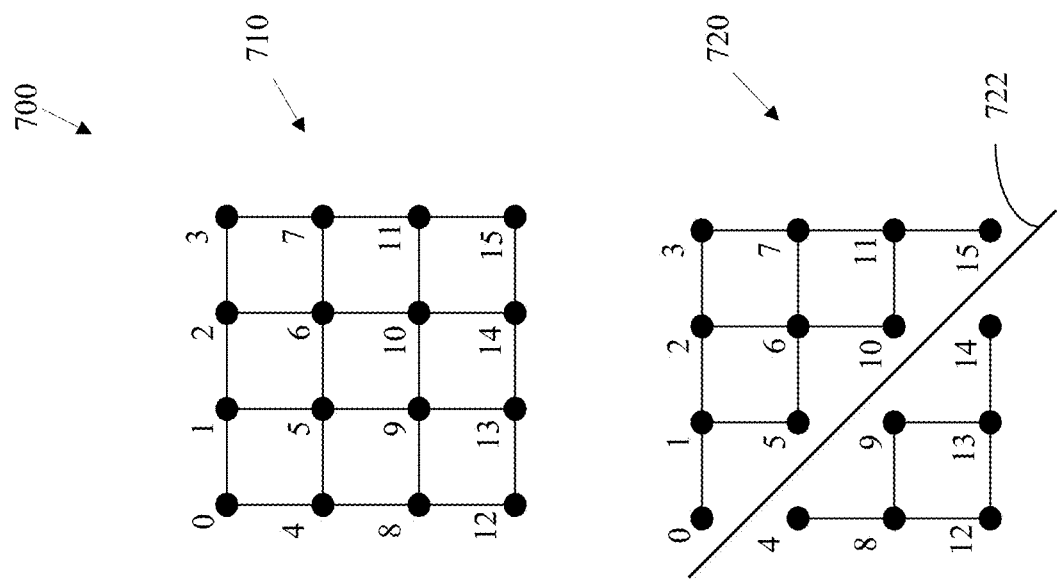
FIG. 7 illustrates an example of generating basis functions for a given border line according to implementations of this disclosure.

FIG. 7 illustrates an example 700 of generating basis functions for a given border line according to implementations of this disclosure. The example 700 is described with respect to a block that is of size 4×4. However, the block can be of any size. Given an image block (not shown), a graph 710 illustrates a fully connected graph where each node is connected to each of its immediate neighbors. That is, each node is connected by respective edges to neighbors of the node. As further described below, the image block can be a block of a source image or can be a residual block. More generally, the image block can be any block that is to be transformed to another domain, such as for the purpose of energy compaction, prior to encoding the transform block into a bitstream, such as the compressed bitstream 404 of FIG. 4. The encoding can include quantizing the transform block.

A graph 710 illustrates a connected graph that does not take into account a border line 722 that may be crossing the image block. The border line 722 splits the image block into two visually distinct parts. Each pixel of the image block is represented by a node in the graph 710. The nodes of the graph 710 are labeled from 0 to 15, where a label corresponds to a particular (x, y) location of the image block. In this example, the nodes are labeled according to a raster scan order (i.e., left-to-right and top-to-bottom). An initial graph Laplacian matrix L can be generated for the image block. Given an image block of size M×M, the matrix L includes $M^2$ rows and $M^2$ columns: one row and one column for each of the nodes. As such, given an image block of size 4×4, the graph Laplacian matrix L includes 16 rows and 16 columns.

In the graph 710, each node is connected to its immediate neighbors. For example, the node 5 is connected to the nodes 1, 4, 6, and 9; and node 15 is connected to the nodes 11 and 14. The matrix L can be thought of as a difference matrix between an adjacency matrix, A, and a degree matrix, D: L=A−D. The degree matrix, D, is a diagonal matrix where each diagonal value, corresponding to a node, indicates the number of nodes that the node is connected to. The adjacency matrix, A, is such that the cell value (x, y) is set to 1 if node x is connected to y in the graph and x≠y, otherwise (x, y) is set 0. A partial listing of the matrix L is shown below. The part of the matrix that corresponds to nodes 0-7 and the links between those nodes is shown in the matrix L.

$$L = \begin{bmatrix} -2 & 1 & 0 & 0 & 1 & 0 & 0 & 0 \\ 1 & -3 & 1 & 0 & 0 & 1 & 0 & 0 \\ 0 & 1 & -3 & 1 & 0 & 0 & 1 & 0 \\ 0 & 0 & 1 & -2 & 0 & 0 & 0 & 1 \\ 1 & 0 & 0 & 0 & -3 & 1 & 0 & 0 \\ 0 & 1 & 0 & 0 & 1 & -4 & 1 & 0 \\ 0 & 0 & 1 & 0 & 0 & 1 & -4 & 1 \\ 0 & 0 & 0 & 1 & 0 & 0 & 1 & -3 \end{bmatrix}$$

As an example, the cell value at (5, 5) is −4 indicating that the node 5 is connected to 4 other nodes; namely the nodes 1, 4, 9, and 6. Correspondingly, the value in each of the cells (5, 1), (5, 4), (5, 6), and (5, 9) is 1. Note that the cell (5, 9) is not shown in the above matrix L. Similarly, the cell value at (0, 0) is −2 indicating that the node 0 is connected to 2 other nodes; namely the nodes 1, and 4. Correspondingly, the value in each of the cells (0, 1) and (0, 4) is 1.

A graph 720 illustrates a graph Laplacian where connections that are crossed by the border line 722 are removed from the graph. The corresponding partial graph Laplacian matrix (i.e., the part of the matrix that corresponds to nodes 0-7 and the links between those nodes) is given by:

$$L = \begin{bmatrix} -1 & 1 & 0 & 0 & 0 & 0 & 0 & 0 \\ 1 & -3 & 1 & 0 & 0 & 1 & 0 & 0 \\ 0 & 1 & -3 & 1 & 0 & 0 & 1 & 0 \\ 0 & 0 & 1 & -2 & 0 & 0 & 0 & 1 \\ 0 & 0 & 0 & 0 & -1 & 0 & 0 & 0 \\ 0 & 1 & 0 & 0 & 0 & -2 & 0 & 0 \\ 0 & 0 & 1 & 0 & 0 & 1 & -4 & 1 \\ 0 & 0 & 0 & 1 & 0 & 0 & 1 & -3 \end{bmatrix}$$

In the above matrix, the cell value at (5, 5) is −2 indicating that the node 5 is now connected to only 2 other nodes; namely the nodes 1 and 6. Correspondingly, the value in each of the cells (5, 1) and (5, 6) is 1. Similarly, the cell value at (0, 0) is −1 indicating that the node 0 is connected to only 1 other node; namely the node 1. Correspondingly, the value in the cells (0, 1) is 1.

In the above example, the graph Laplacian matrix is calculated as L=A−D (i.e., the adjacency matrix minus the degree matrix). However, the graph Laplacian matrix could similarly be calculated as L=D−A (the degree matrix minus the adjacency matrix). As such, the signs in the above matrix would be reversed: positive integers at the diagonals and negative 1 elsewhere (i.e., where 2 nodes are connected). While described above is the use of immediate neighbors, in some implementations, the graph Laplacian (and the corresponding graph Laplacian matrix) can be generated using all eight neighbors of a pixel. For example, the eight neighbors of the node 6 are the nodes 1, 2, 3, 5, 7, 9, 10, and 11. In some examples, different weights can be used for short neighbors (i.e., the immediate neighbors, such as 2, 5, 7, and 10) as compared to the long neighbors (i.e., the diagonal neighbors, such as 1, 3, 9, and 11). In an example, the ratio of the weights can be long:short=2:1. As such, a 'long' neighbor edge contributes twice as much to the diagonal matrix entry as a short edge. Other relative weights are also possible.

To reiterate, the border line 722 splits the image block into two visually distinct parts; namely a first part that includes the pixels corresponding to the nodes 0-3, 5-7, 10-11, and 15; and a second part that includes the pixels corresponding to the nodes 4, 8-9, and 12-14.

The set of basis functions to be used for transforming the image block are the eigenfunctions (i.e., eigenvectors) of the graph 720. Said another way, the basis functions are the eigenfunctions of a modified graph from in which all the edges that are cut (e.g., crossed) by the border line are removed. A connected component of the graph that contains k nodes/pixels is associated with a set of k eigenfunctions that are zero on all the nodes/pixels that do not belong to this connected component. References herein to eigenfunctions (or eigenvectors) should be understood to encompass the corresponding eigenvalues.

The eigenfunctions constitute a new set of basis functions that correspond to the way that a line (i.e., the border line 722) splits the block.

So that an encoder and a decoder generate the same results, it may be necessary for the encoder and the decoder to use the same algorithm when determining (e.g., selecting, retrieving, storing, calculating, etc.) the basis functions. Additionally, to ensure consistent behavior across different hardware architectures, some tricks/techniques for handling floating point numbers may be employed. For some symmetric, and hence degenerate, configurations, such as splitting an 8×8 block into two 8×4 blocks, the resulting basis functions may have precisely the same eigenvalue. In such a situation, any linear combination of two eigenfunctions for the same eigenvalue is also an eigenfunction for this eigenvalue. In such situations, slightly different interpretations of the floating point numbers standard for different processors could make the decoder generate different basis functions than the encoder. A simple trick to circumvent the problem can be to, instead of attributing the precise value of +1 or −1 to an edge of the graph Laplacian, attribute (e.g., use, assign, etc.), for each possible edge in an 8×8 block, a fixed pseudorandom number that is known both to the encoder and decoder and that is very close to 1. In an example, the pseudorandom number can be 1.000053. However, other pseudorandom number values are possible. The pseudorandom number can be used as a multiplier for the edge's contribution. As such, the pseudorandom number can also be used in calculating the degree values (i.e., the diagonal values) of the matrix Laplacian.

While FIG. 7 is described with respect to a line (i.e., the border line 722) crossing the image block, the shape that crosses the block does not need to be a line. The process for determining the eigenfunctions remains the same. That is, the fully connected graph can be disconnected according to how the shape crosses the block and the eigenfunctions (i.e., the set of basis functions) of the resulting graph Laplacian are then calculated. The set of basis functions can then be used to transform the image block.

In an example, an encoder can encode (such as in the compressed bitstream) parameters describing the shape and the transform coefficients resulting from transforming the block using the basis functions. A decoder can reconstitute the shape from the parameters and calculate the eigenfunctions. The decoder can then use the eigenfunctions (and corresponding eigenvalues) to inverse transform the transform coefficients into an image block.

In an illustrative example, the equation $3*x-7*y-0.1>0$ can be used to generate a first line that splits an image block into two regions. The first line can be used to calculate the corresponding set of basis functions for the split of the image block. Subsequent lines can be derived by subsequent rotations of the line. As such, the parameters 3, −7 and −0.1 can be encoded. In another example, if the shape is a circle that can be described by the equation $(x-4)^2+(y-4)^2=2.5^2$, then the parameters 4, 4, and 2.5 can be encoded. In yet another example, the shape can be a corner, such as one that splits the block according to $(1 \text{ if } x<4 \text{ else } 0)*(1 \text{ if } y<4 \text{ else } 0)$; that is, a pixel belong to a first region if the x coordinate of the pixel is less than 4 or the y coordinate of the pixel is less than 4, otherwise the pixel belong to a second region. In yet another example, the shape can be a curved line (i.e., a quadric or a part of a quadric) that can be approximated by a quadratic equation. As such, the shape can be an ellipse, a parabola, a hyperbola, or the like. The coefficients of the quadratic equation can be encoded in the bitstream. It should be noted that it only matters for which edges the endpoints have opposite sign with respect to the splitting equation(s). There can be multiple ways to describe equations for which the level set intersects the edges to be removed. In an example, an equation is selected such that the resulting set of coefficients is easy to encode. In some implementations, small deviations that split the block in a way that is slightly different from the intended split can be used, if such an alternative split can be described with coefficients that can be encoded with fewer bits.

A border can cross an image block in may possible ways. For example, a first border line can cross the image block at a first angle (e.g., with respect to some line) and a second border line can cross the image block at a second angle that differs, even if slightly from the first angle. For example, a third border line and a fourth borderline can have the same angle but can cross the image block at different locations.

In an example, a closest matching line to the shape can be determined and the image block is encoded using the set of basis functions of the closest matching line. While in some implementations, sets of basis functions corresponding to each way that a line can cross an image block, such implementations may be impractical and/or unnecessary. It may not be necessary to consider all possible and distinct ways that a line can cross an image block because, at least, may such distinct cases are indistinguishable (e.g., imperceptible).

FIG. 8 illustrates an example 800 of lines crossing a block at different angles according to implementations of this disclosure. The example 800 includes blocks 802, 804, and 806. Each of the blocks 802-806 is of size 8×8. However, a block according to disclosure is not limited to the size of 8×8. For example, the block can be smaller (such as a 4×4 or 2×2 block) or larger (such as 16×16, 32×32, 64×64, or larger). Additionally, the block need not be a square block. For example, the teachings herein can be easily adapted to non-square pixel grids, such as triangular, hexagonal, or parallelogram lattices. In the example 800, each of the black circles, such as a circle 808) indicates a corresponding pixel location in the respective block.

The block 802 is crossed by a line 810; the block 804 is crossed by a line 812; and the block 806 is crossed by a line 814. Each of the lines 810, 812, and 814 is comprised of all the star-shaped non-integer pixel locations of the blocks 802, 804, and 806, respectively. The lines 810, 812, and 814 are not shown as straight lines. It is noted that the blocks 802, 804, and 806 are considered to be zoomed blocks and the lines 810, 812, and 814 are pixelated lines. Each of lines 810, 812, and 814 defines two types of pixels: Those pixels that are on one side of the line and those pixels that are on the other side of the line. No pixel of the blocks 802, 804, 806 is on the respective line that crosses the block. The lines 810, 812, and 814 can be considered to be fictitious lines that cross between the pixels of a block. Again, each pixel of a block is either one side of the line or the other side of the line; and none of pixels are on the line. This in turn can mean that a splitting line is not parametrized in such a way that the center of a pixel lands exactly on the line.

The lines 810 and 812 are practically the same line. Effectively, the line 812 is a left 1-pixel shift of the line 810. That is, the line 812 is the same as the line 810 with the exception that the line 812 is shifted to the left by 1 pixel. As such, the steps down in the lines 810 and 812 are at slightly different locations. The lines 810 and 812 are sufficiently close such that the same set of basis functions can be used for transforming (e.g., encoding) the blocks 802 and 804. Visually, the blocks 802 and 804 are almost indiscernible (after approximating the contents of the blocks 802 and 804). Contrastingly, the line 814 may be considered to be sufficiently different from the lines 810 and 812. Accordingly, a set of basis functions corresponding to the way that the line 814 splits the block 806 can be used for transforming the block 806.

FIG. 9 illustrates an example 900 of lines crossing a block at different translational shifts according to implementations of this disclosure. The example 900 includes blocks 902, 904, and 906, which can be as described with respect to FIG. 8. The black circles are integer pixel locations. A line 908 crosses the block 902; a line 910 crosses the block 904; and a line 912 crosses the block 906. The lines 908, 910, and 912 cross the respective blocks at non-integer pixel locations. That is, the center of no pixels of blocks 902, 904, and 906 lands exactly on the lines 908, 910, and 912, respectively. The lines 908, 910, 912 have the same direction. However, the lines 908, 910, 912 cross the respective blocks at different locations. The lines 908, 910, and 912 split the blocks 902, 904, and 906, respectively, into 2 components: a first component including those pixels that are on one side of the line and a second component including those pixels that are on the other side of the line.

While, only 3 crossing locations are shown, it can be appreciated that a line having the same direction as that of the lines 908, 910, 912 can cross a block at significantly more locations. It is also to be noted that the pattern of the block 902 can be obtained from the pattern of the block 906 by mirroring the pattern of the block 906 across the South-West-NorthEast diagonal line of the block 906, and vice versa.

As the number of possible splitting lines of a block can be significantly high, in an implementation, the number of lines can be limited. That is, of the many different line directions and translational shifts, a subset can be selected for the purpose of selecting basis function sets.

In an example, and for 8×8 image block, eight (8) line directions can be selected. The line directions can correspond to the angles 0 degrees, 22.5 degrees, 45 degrees, 67.5 degrees, 90 degrees, 112.5 degrees, 135 degrees, and 157.5 degrees. It is noted that 180 degrees gives the same direction as 0 degrees, 202.5 degrees is the same as 22.5 degrees, and so on. In an example, eight (8) different translational shifts can be used with each of the selected angles. It is noted that for the directions of 0 and 90 degrees, respectively, every row and column can be represented. That is, for the directions of 0 (90) degrees, a line crossing (e.g., being coincident with) each of the rows (columns) of the image block can be represented in the set of basis function sets.

It is also noted that, for directions such as 45 degrees (such as illustrated in the blocks 902 and 904), it may not be possible to discriminate the cases illustrated in the blocks 902 and 904 when using 8 displacements. However, that is visually generally acceptable. As mentioned above, the selected set of basis functions that corresponds to a line and that is used for transforming the block is such that extra bits need not be expended in order to suppress ringing in a part of the block. As such, having a set of basis functions that mostly solves the problem of suppressing ringing with fewer bits (for example as compared to the DCT basis functions) but that slightly mis-estimates the location of the border can be considered to be visually acceptable.

To summarize, in an example, 64 different sets of basis functions (i.e., candidate sets) can be available. The 64 candidate sets corresponding to eight line directions and eight ways (i.e., translational shifts) that each of the lines can cross a block. That is, the 64 different sets of basis functions correspond to how a line splits the block.

In an implementation, the candidate set of sets of basis functions can be calculated by a codec (e.g, encoder and/or decoder) at, for example, startup time of the codec and stored for later use. In an implementation, a set of basis functions can be calculated on demand (and cached for later use). That is, when a block is determined to be crossed by a certain line, the set of basis of functions corresponding to that line can be calculated. In the above cases, the codec can include an eigenvalue solver, which can be used to determine the eigenfunctions for the graph Laplacians, as described with respect to FIG. 7. In another implementation, the candidate sets of basis functions can be precalculated and stored in (or are accessible by) the codec. Each basis function can be represented by (e.g., stored as) a two-dimensional array (e.g., matrix) of real values along with their corresponding eigenvalues.

A line that crosses the block thereby splitting the block into two distinct regions can be characterized (e.g., identified) by a pixel (i.e., a pixel of the block) on the line that is closest to the origin of the block. For ease of reference, such pixel is referred to herein as the closest pixel. The origin of the block can be considered to be a center point of the block. However, the origin of the block can be any other pixel that can be used a reference point for the block. For example, the origin can be the top-left pixel of the block. It is noted that the center of the block may be at a point that is at a subpixel location, such as in the case of an M×M block where M is a positive, even integer. The closest pixel can be the pixel (e.g., the pixel location) obtained by drawing a perpendicular line from the origin to the line. The location of intersection of the line and the perpendicular line is the pixel (e.g., point) of the line that is closest to the origin. The location of the closest pixel uniquely identifies the direction of the line and where the line crosses the block.

The closest pixel can be in any octant (i.e., triangle, $\frac{1}{8}^{th}$ slice) of the block. If the closest pixel is in one octant, the closest pixel can be mapped to another pixel location in a second octant using rotation and/or mirroring operations. In an example, the closest pixel, regardless of what other octant it may be in, can be mapped to the north-northeast octant using at least one of rotation or mirroring. As such, the 64 candidate sets can be canonized to only eight candidate sets. That is, the set of 64 candidate sets of basis functions can be reduced to a set of eight sets of basis functions. As such, only eight sets of basis functions can be stored (or calculated). In an example, however, if the splitting lines include lines that are at 0 degrees and 90 degrees, then the orbit of a set of basis functions under symmetry, for those two directions, would have four elements, instead of eight.

In general, pre-stored sets of basis functions may be associated with shapes other than lines. For example, and as mentioned above, the shape can be a circle, an oval, a quadric, a corner, or some other shape. A subset of the ways that the shape can be placed in, or splits, the image block thereby dividing the image block into distinct regions can be selected. For each of the selected placements, the eigenfunctions corresponding to the graph Laplacian (i.e., the graph resulting from disconnecting edge according to the placement) can be calculated, such as using an eigenvector solver, and stored. Alternatively, the eigenvectors can be calculated (such as by a decoder) in response to receiving parameters in a compressed bitstream, such as the compressed bitstream 404 of FIG. 5, describing the shape and the placement of the shape.

Figure 10:
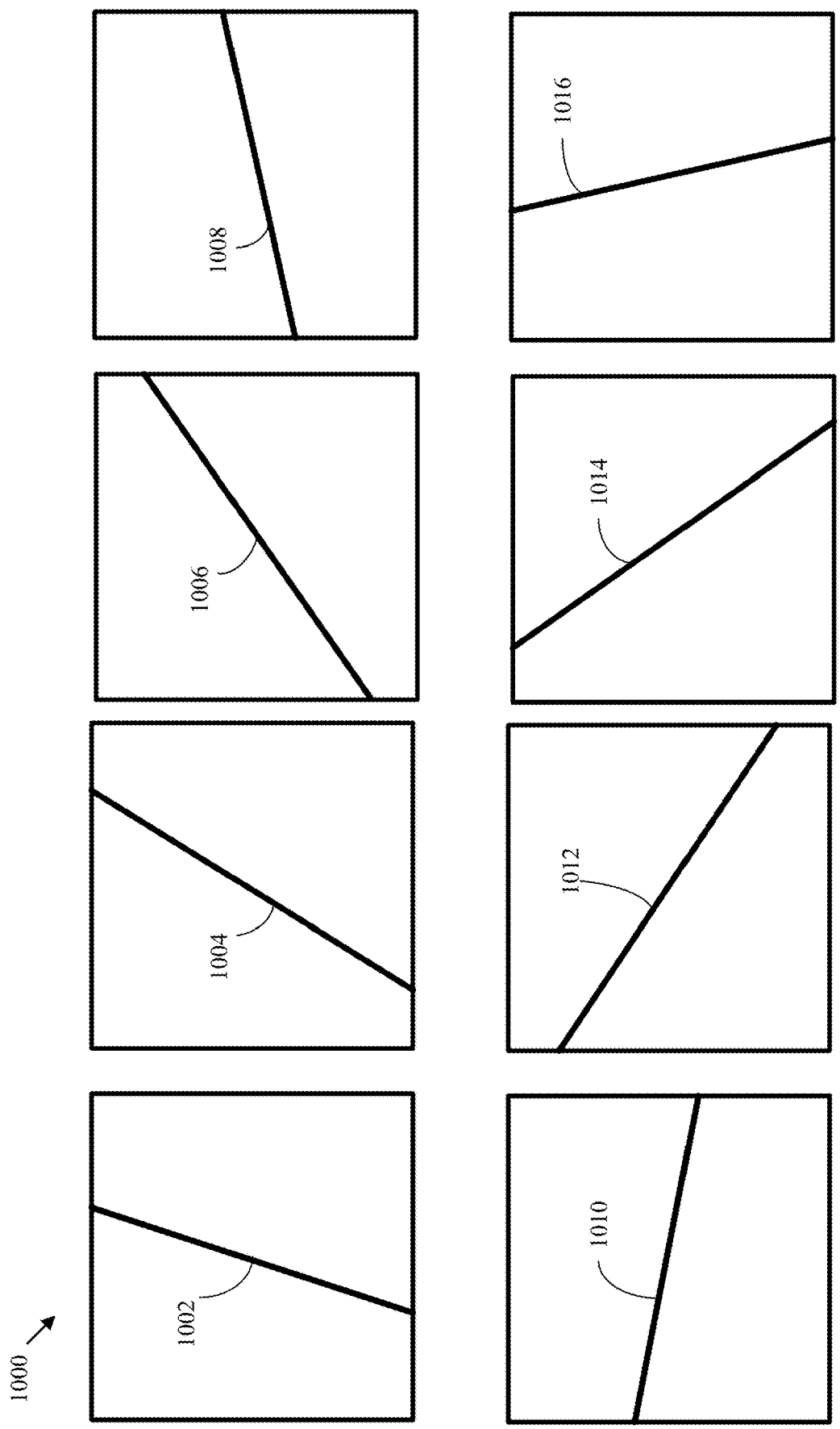
FIG. 10 is an example of borders crossing a block according to implementation of this disclosure.

FIG. 10 is an example of borders 1000 crossing a block according to implementation of this disclosure. The borders 1000 correspond to eight splitting directions of a block. Line 1002-1016 correspond, respectively, to the direction of the short hand (i.e., the hour hand) of an analog clock at 0:22:30, 1:07:30, 1:52:30, 2:37:30, 3:22:30, 4:07:30, 4:52:30, and 5:37:30. However, other lines are possible. Starting with the line 1002, which indicates a direction of the short hand at the time 0:22:30, each of the lines 1004-1016 is offset from the preceding line by a 45-minute increment. The next (i.e., 45 minutes from 5:37:30) hand direction would correspond to the time 6:22:30, which can be represented by the same, the line 1002.

When 90-degree rotations and mirroring along a diagonal of the block are used, the directions of the lines 1002-1016 can divided into two sets of four directions, each: 1) four directions (namely, the lines 1002, 1008, 1010, and 1016) that are more horizontal or vertical than diagonal; and 2) four directions (namely, the lines 1004, 1006, 1012, and 1014) that are more diagonal than horizontal or vertical. Each of these two sets is the orbit of a line under the (rotating and mirroring) symmetries of the square. That is, symmetries of the square transform a line of the one type into another line of the same type, and never a line of the other type.

As mentioned above, eight possible translational shifts (e.g., where the line crosses the block and thereby splitting the block) can be considered. However, four of such shifts can be obtained from the other four shifts by a 360 degree rotation.

FIGS. 11A-11D are examples of sets of basis functions according to an implementation of this disclosure. As described above, each set of basis function can be calculated (e.g., derived) using an eigenvalue solver. Each set of basis functions corresponds to generating the eigenfunctions (and, as mentioned above, the corresponding eigenvalues) of a graph Laplacian matrix that corresponds to a line having a certain direction and crossing an image block at a certain translational shift location. The examples of FIGS. 11A-11D are examples of basis functions for an 8×8 block. That is, each set of basis functions includes 8*8=64 basis functions. However, as already mentioned, this disclosure is not limited to block sizes of any certain size. FIGS. 11A-11D illustrate sets of basis functions for some, but not all, of the lines 1002-1016 of FIG. 10.

Figure 11A:
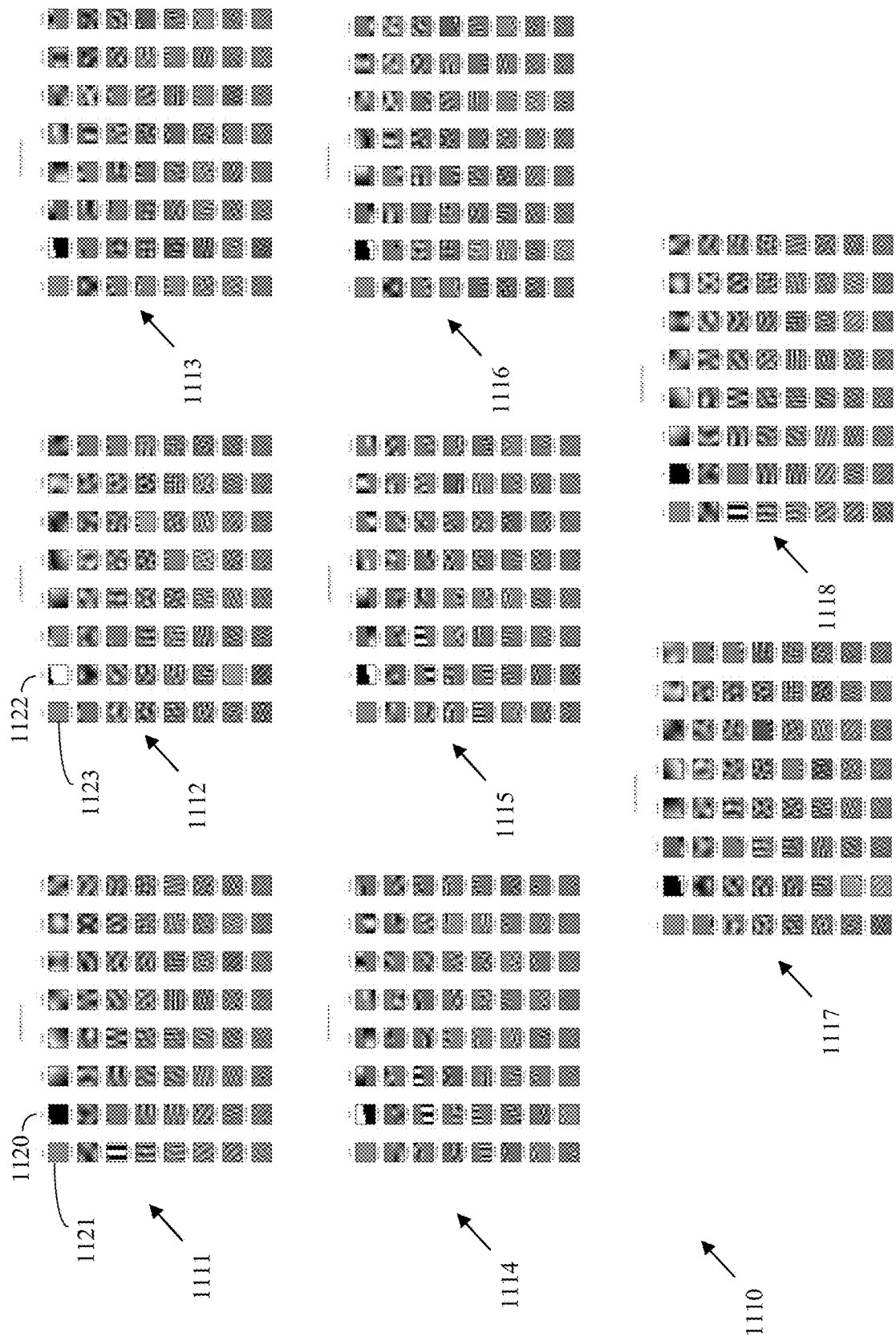
FIGS. 11A-11D are examples of sets of basis functions according to an implementation of this disclosure.

Sets of basis functions 1110 of FIG. 11A correspond to the line 1008 of FIG. 10 crossing an 8×8 image block at different locations. As mentioned above, in an example, eight possible crossing locations are considered. As such, FIG. 11A includes eight sets of basis functions; namely, basis function sets 1111-1118, and similarly for FIGS. 11B-11D. Sets of basis functions 1130 of FIG. 11B correspond to the line 1006 of FIG. 10 crossing an 8×8 image block at different locations. Sets of basis functions 1150 of FIG. 11C correspond to the line 1004 of FIG. 10 crossing an 8×8 image block at different locations. Sets of basis functions 1170 of FIG. 11D correspond to the line 1002 of FIG. 10 crossing an 8×8 image block at different locations.

Figure 11B:
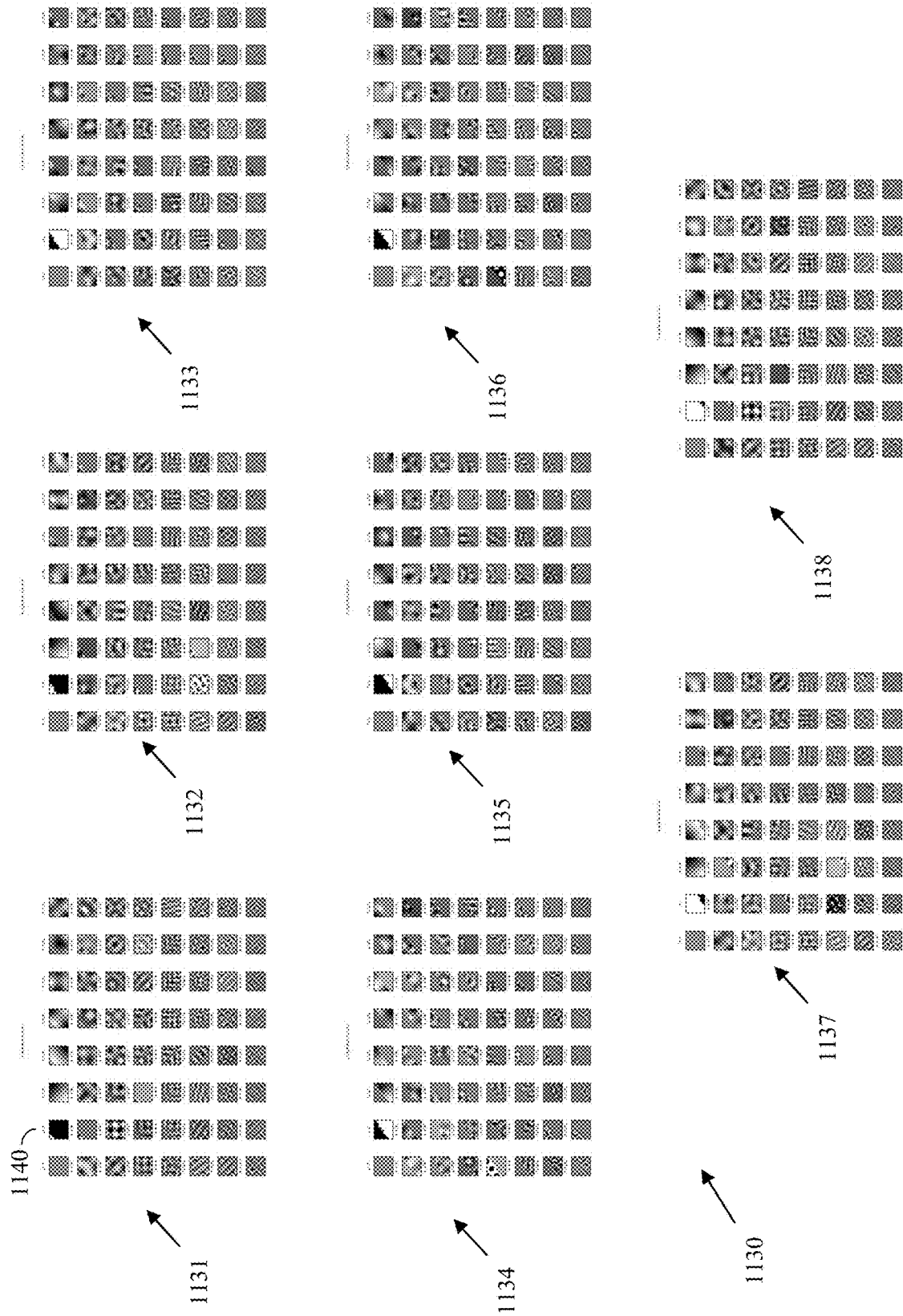
Figure 11C:
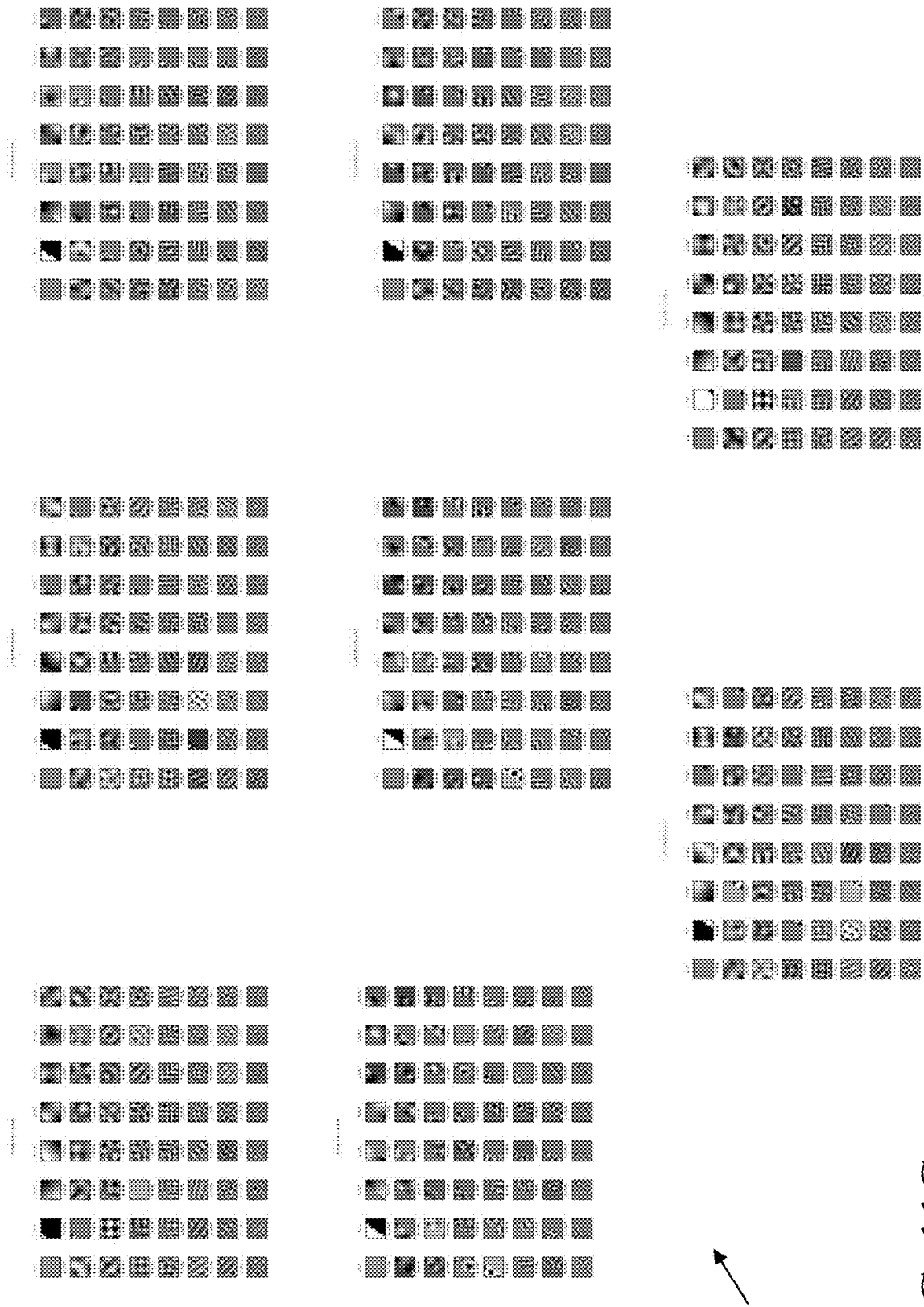
Figure 11D:
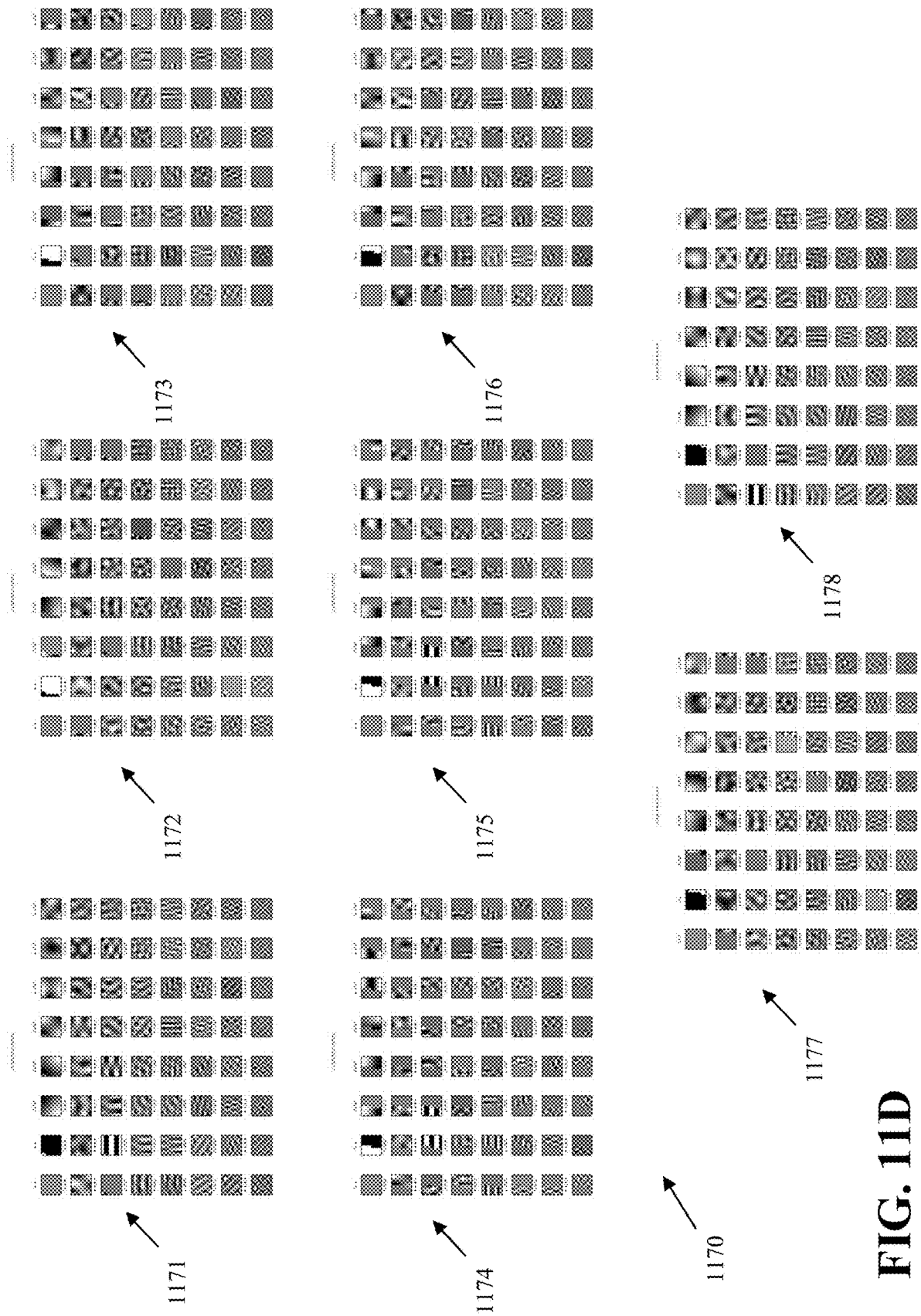

It can be observed that each of the basis function sets 1171-1178 of FIG. 11D can be obtained, respectively, from a corresponding one of the basis function set 1111-1118 of FIG. 11A using a reflection along the NorthWest-SouthEast diagonal.

More specifically, a split 1120 of FIG. 11A indicates that the line 1008 crosses (i.e., splits) the block into a first portion that includes 2 pixels near a corner of the block and a second portion that includes the remaining 62 pixels. The split 1120 is technically a basis function. However, because the split 1120 visually illustrates how a line crosses the block, it is referred to as a split. Similarly for other basis functions that are referred as splits.

In general, there are in total eight possible ways of selecting a corner-pixel plus an adjacent pixel in a block. For each such selection (i.e., a selection of a corner pixel and an adjacent pixel), the set of basis functions can be obtained from the basis function sets 1111 using rotation and/or mirroring.

It is noted that many approaches to image compression assume that the basis functions for spatial variations is such that a constant-across-the-block function is part of the set. Using the DCT basis functions of FIG. 6 as an example, the DCT basis functions includes the function 602, which is the constant-across-the-block function.

It is noted that in each of the sets of basis functions described here, the two lowest energy basis functions correspond to an eigenvalue of zero (or approximately zero). For example, a basis function 1121 and the basis function corresponding to the split 1120 each corresponds to an eigenvalue of zero; similarly, a basis function 1123 and the basis function corresponding to the split 1122 each corresponds to an eigenvalue of zero; and so on. That is, each of such two eigenfunctions have the same energy; namely, zero. As such, these two independent basis functions represent 'no spatial variation between graph-neighbors'. These can be picked as taking on the value 1 on one graph component, and 0 or the other. Alternatively, one function can be picked to actually be constant across the entire block, and the other one having values +1 and −1 on the two different graph components (i.e., on different sides of the boundary). The eigenfunction can be normalized. That is, the eigenfunction can be scaled such that the sum of the squares of the 64-vector is 1. As such, the eigenfunctions can be unit vectors.

The eigenvalue-degeneracy that comes from the constant-on-each-component functions may not be avoidable. It often is the case that other components of an image compression system assume that a constant-brightness block can be described with a single coefficient for the leading basis function. Implementations according to this disclosure can also ensure that the constant brightness can be described with a single coefficient via a redefinition of the basis of the eigenvalue-0 eigenspace.

Figures 15, 16:
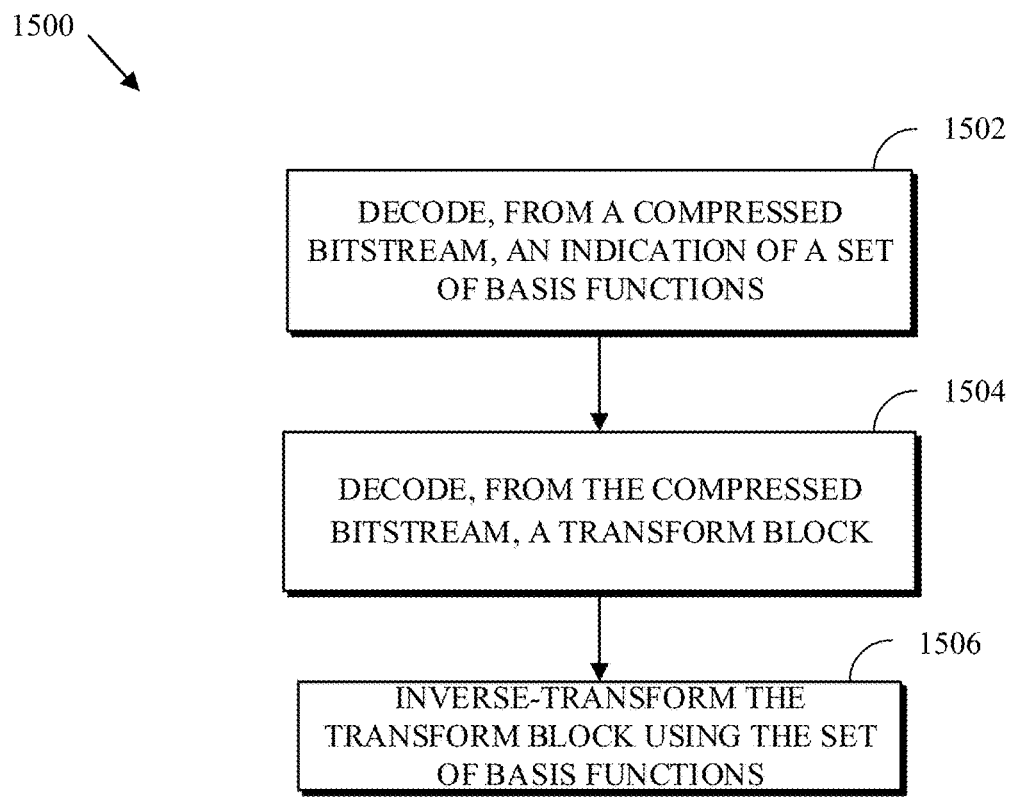
FIG. 15 is an example of a flowchart diagram of a process for decoding a block of a frame according to an implementation of this disclosure.
FIG. 16 is an example of an interleaved tower of eigenvalues according to implementations of this disclosure.

The sets of basis functions described herein are naturally ordered by "energy" of the graph Laplacian. In general, each set of basis functions constitutes two interleaved towers of basis functions: one set being zero on one part of the split graph and spatially varying on the other, and the other set vice versa, with the roles of the components exchanged. For example, the eigenvalues corresponding to eigenfunctions that are zero on the one component (e.g., the small component that includes the nodes 4, 8-9, and 12-14 of FIG. 7) of the graph Laplacian may be 0.0, 1.3, 2.4, 3.0, 3.5, 4.3, ... , and the eigenvalues corresponding to eigenfunctions that are zero on the other component (e.g., the large component of the FIG. 7) of the graph Laplacian may be 0.0, 2.8, 4.2, 4.7, .... These values can be visualized as shown in FIG. 16. This 'energy ordering' automatically provides a desired (for compression, in particular quantization) ordering in terms of increasingly rapid spatial variation. As such, in an implementation, it is possible to consistently truncate all spatial variations that oscillate more rapidly than a given threshold by thresholding the graph energy-eigenvalue.

Truncating can mean ignoring the corresponding eigenfunctions with fast spatial variations. Equivalently, truncating can mean setting the coefficients to zero that multiply them. It is noted that, for example, if a choice is made such as to ignore all spatial variations that have a length scale of less than ⅓ the edge length of the block, then this decision corresponds to picking a threshold on the eigenvalue of the Laplace matrix. That is, it is not the case, for example, that this threshold would eliminate spatial variations above a first characteristic size S_a for a first component of the graph and variations above a second characteristic size S_b for a second component of the graph. Rather, the picked threshold corresponds to the same characteristic size on both, the first and the second, graph components.

It is also noted that each of the sets of basis functions of FIGS. 11A-11D is ordered in terms of increasing frequency. As such, each of the function sets of FIGS. 11A-11D, if read in raster order (e.g., first row, from left to right, followed by the second row from left to right, and so on), corresponds to increasing energy of oscillations.

In general, each function-set has 7 other equivalent function sets. That is, each of the 8 function sets can be derived from one of the other seven via rotation and/or mirroring.

The lines described with respect to FIG. 10 do not include vertical and horizontal lines. As such, block splits based on a horizontal (vertical) line can be approximated by the split using the line 1008 (1002).

However, in some implementations, it may be desirable to also include horizontal and vertical lines. That is, it may be desirable to consider lines that split a block into two horizontal or two vertical portions. As such, four more function sets can be added. Each of the added function sets corresponds to chopping 1, 2, 3, and 4 lines off the block. That is, each of the added function sets corresponds to (e.g., crossing) the block at a first, second, third, or fourth row (or column). These four, by symmetry, can be used to generate all the ways of splitting a block along a coordinate-parallel line (i.e., a vertical line or a horizontal line). As such, an additional 16 function sets (i.e., corresponding to {4 basis functions}×{4 rotations}=16) can be added resulting in a total of 64+16=80 ways to split a block. A selection of one out of 80 can be encoded with no more than 6.33 (i.e., $\log_2(80)=6.33$) bits per block. Each of 80 ways of splitting a block can have a corresponding function set. However, as already described, some of the function sets can be derived from others using rotation and/or mirroring.

The 80 function sets can be reduced without loss. For example, as mentioned below with respect to split corresponding to the function set 1140, some rotations or mirroring of such a split are indistinguishable. As such, any redundant (e.g., duplicate, indistinguishable) spits need not be duplicated. In the example splits described herein, there are 4 pairs of duplicates, including the split corresponding to the function set 1140. As such, in the case where 64 function sets are used, the effective number of function sets can be 64−4=60, a selected one of which can be encoded using no more than 5.91 bits; and, in the case where 80 functions sets are used, the effective number of function sets can be 80−4=76, a selected one of which can be encoded using no more than 6.25 bits. If an image preferentially uses just a few of these choices (e.g., mostly vertical splits), then entropy coding can reduce the number of bits needed further.

As mentioned above, the shape that crosses (e.g., splits, partitions) the block can be a corner. In an implementation, the possible ways of splitting a block using a corner can include coordinate-aligned corners such that each corner-edge is at least a certain number of pixels from the block edge. In an example, the certain number of pixels can be 3. As such, and given an 8×8 block, there are five such corners; namely, a 3×4, a 4×4, a 3×5, a 4×5, and a 5×5 corner. Some other corners can be approximated by a straight line split. For example, with respect to a 2×6 corner (for example), a straight-line split mostly along the 6-pixel edge can be used as a good approximation. For example, the basis function set 1113 can be used as an approximation for the transforming a block that includes a 2×6 corner.

Figure 12:
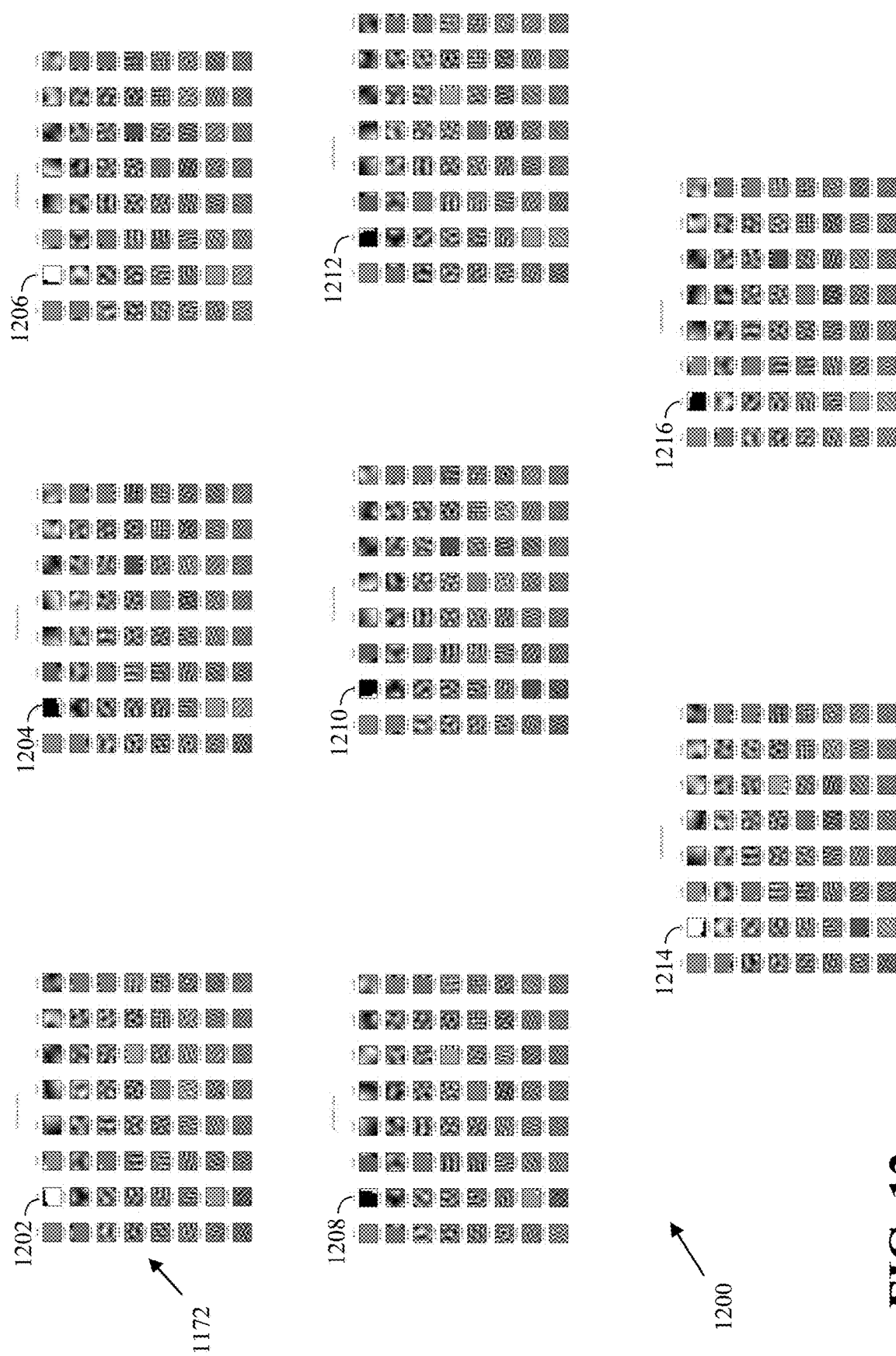
FIG. 12 is an example of equivalent function sets according to implementations of this disclosure.

FIG. 12 is an example of equivalent function sets 1200 according to implementations of this disclosure. The equivalent function sets 1200 includes the basis function set 1172 of FIG. 10D. The basis function set 1172 is the function-set given a L-shaped split of a block, as illustrated by a split 1202. As mentioned, the split according to the split 1202 has 7 equivalents as can be appreciated by inspection of bases functions 1204, 1206, 1208, 1210, 1212, 1214, an 1216. As can also be appreciated each of the 8 function sets of FIG. 12 can be derived from one of the other seven via rotation and/or mirroring.

The sets of basis function 1130 of FIG. 11B includes a function set 1140 that corresponds to a split of an image block into a corner that includes three (3) pixels and the rest of the pixels (e.g., 61 pixels, in the case of an 8×8 block). The three (3) pixels are the corner pixel, its neighboring pixel to the right, and a neighboring pixel that is below the corner pixel. This case is invariant under one reflection; namely, the reflection across the NorthWest-SouthEast diagonal. As such, for some line directions and/or crossing locations, less than seven equivalents may be required to be generated and/or stored.

Figure 13:
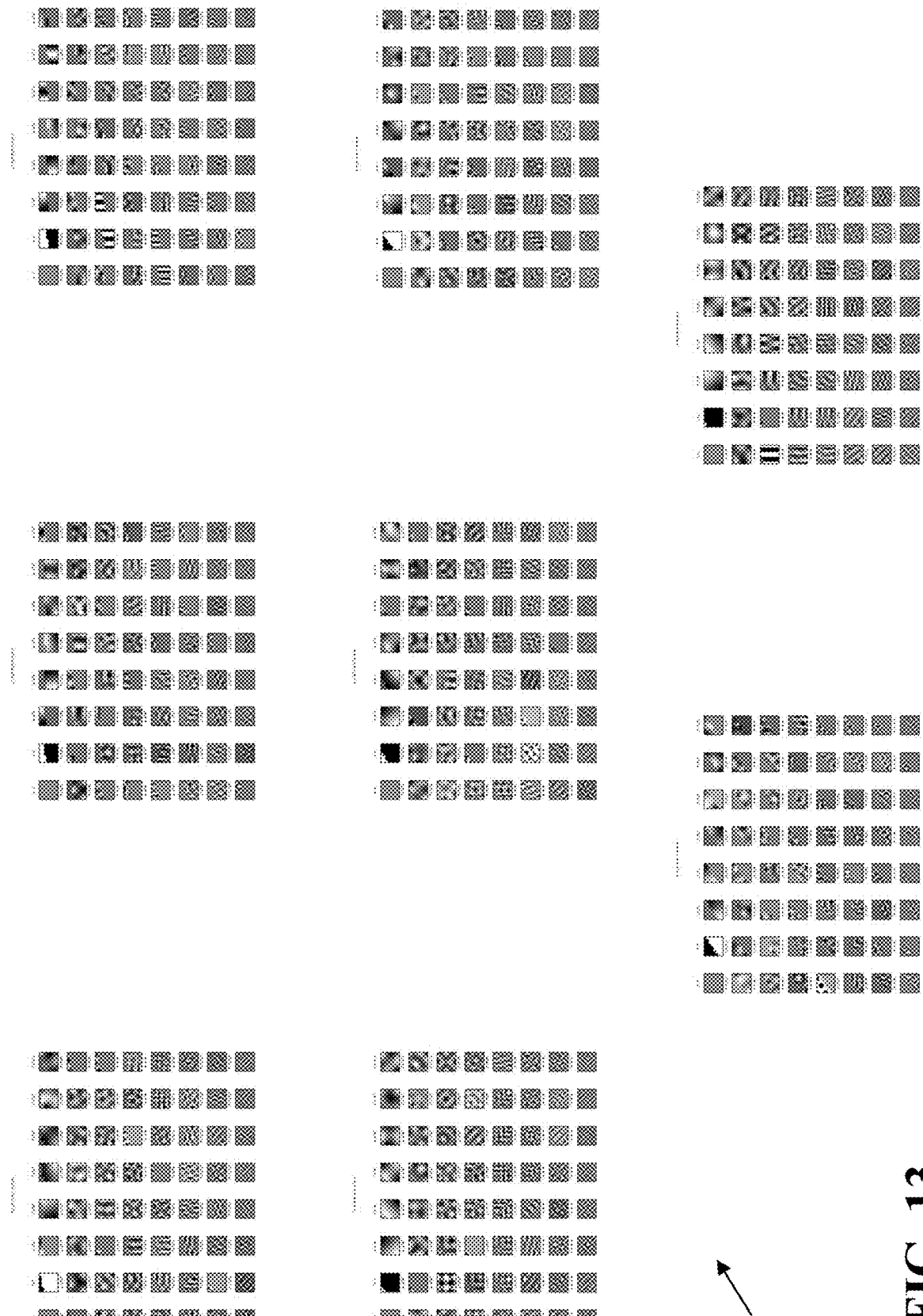
FIG. 13 is an example of canonical sets of function sets according to implementations of this disclosure.

FIG. 13 is an example of canonical sets of function sets 1300 according to implementations of this disclosure. Taking symmetry into account, the functions sets illustrated in FIG. 13 can be the function sets that are stored (or computed at startup time) in a codec and from which all other function sets can be derived. As eight function sets, each including 64 basis functions can be stored, and wherein each basis function is an 8×8 block. As such, a total of $2^{15}$ real numbers, or 128K bytes at single-float precision are required to be stored (or computed and stored).

The above can be summarized as having available a collection of ways to split a block (such as according to one out of 64 different splitting lines) where some elements in the collection may be related to other elements by some rotation/mirror symmetry of the block. This symmetry may be exploited to avoid some eigen basis computations.

Figure 14:
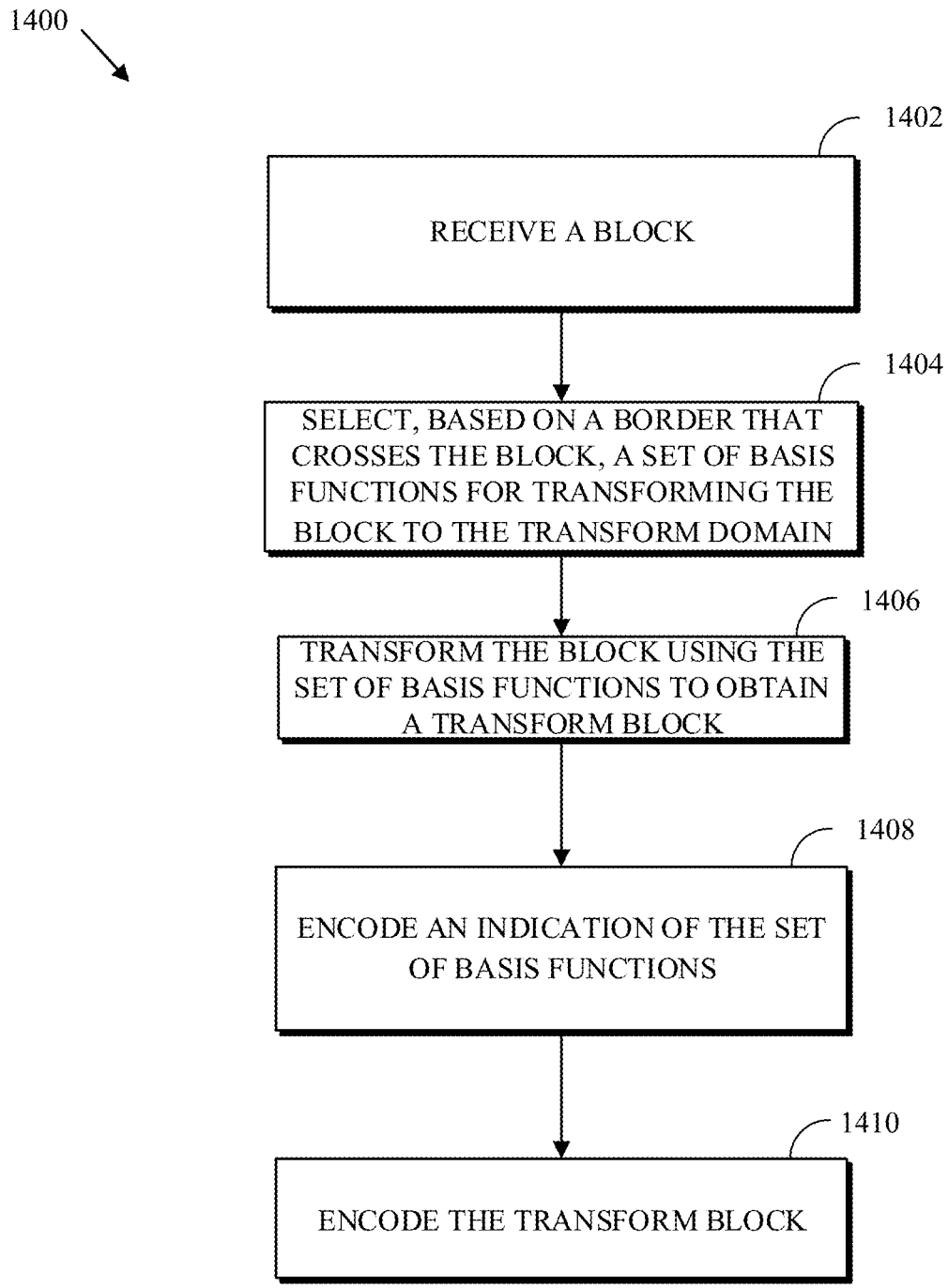
FIG. 14 is an example of a flowchart diagram of a process for encoding a block of a frame according to an implementation of this disclosure.

FIG. 14 is an example of a flowchart diagram of a process 1400 for encoding a block of a frame according to an implementation of this disclosure. The frame can be a standalone image. The frame can be frame of a video stream. The block can be of any rectangular or square size. For example, the block can be 4×4, 8×8, 12×12, of smaller, or larger size. The block is a block of pixels, each having a pixel value. That is, the block is in the spatial (or pixel) domain. The block can include a border. That is, a border (or line) splits the blocks into at least two distinct regions. The process 1400 converts the block, which is in the pixel domain, to a transform block, which is in the frequency domain, to compact the energy in the block. The transform block includes transform coefficients and can be of the same size as the block.

When transforming the block to the transform domain, the process 1400 selects a set of basis functions that takes into consideration the border, such as the orientation of the border and where the border crosses the block. By selecting the set of basis functions considering the border, the number of non-zero coefficients in the transform block can be reduced (for example, as compared to not using a set of basis function that takes the border into consideration). Consequently, the number of bits required to encode the transform block can be reduced.

The process 1400 can be implemented, for example, as a software program that can be executed by a computing device, such as the computing device 100 of FIG. 1 or one of the computing and communication devices 100A, 100B, 100C of FIG. 2. The software program can include machine-readable instructions (e.g., executable instructions) that can be stored in a memory, such as the memory 110 of FIG. 1, and that can be executed by a processor, such as the processor 120 of FIG. 1, to cause the computing device to perform the process 1400. The process 1400 can be implemented in an encoder, such as the encoder 400 of FIG. 4. In at least some implementations, the process 1400 can be performed in whole or in part by the transform unit 420 of the encoder 400 of FIG. 4.

The process 1400 can be implemented using specialized hardware or firmware. Some computing devices can have multiple memories, multiple processors, or both. The steps or operations of the process 1400 can be distributed using different processors, memories, or both. Use of the terms "processor" or "memory" in the singular encompasses computing devices that have one processor or one memory as well as devices that have multiple processors or multiple memories that can be used in the performance of some or all of the recited steps or operations.

At 1402, the process 1400 receives the block. As used in this disclosure, "receive" can mean create, form, produce, select, construct, determine, specify, generate, or other receive in any manner whatsoever. In an example, the block can be a source image block. That is, the block can be one of the blocks 340 of FIG. 3. In an example, the block can be a residual block, such as described with respect to intra/inter prediction unit 410 of FIG. 4. In an example, the block can be received by a transform unit, such as the transform unit 420 of FIG. 4. The block can be a luma block, a chroma block, other color component block, or any block that contains image data.

At 1404, the process 1400 selects, based on the border that crosses the block, a set of basis functions for transforming the block to the transform domain. The border can be one or more lines that cross (e.g., partition) the block. While, for simplicity of explanation, the disclosure herein is generally described with respect to one line or shape, the teachings herein are applicable and generalizable to multiples lines and/or shapes.

In an example, the block can be analyzed to determine whether a border crosses the block. For example, an edge detection technique can be used to determine whether a border crosses the block. Once the border is identified, the direction (e.g., orientation) of the border and the location at which the border crosses the block can be used to select a set of basis functions for transforming the block. In an example, a lookup table that maps border orientation and crossing locations combination to sets of basis functions can be used to select the set of basis functions (e.g., a canonical function set).

In another example, each of the available candidate sets can be used to encode the block resulting in respective transform blocks. The one of the candidate sets resulting in the best coding efficiency can be selected for transforming the block. In an example, coding efficiency can be measured in terms of both rate (e.g., bitrate) and distortion, as a rate-distortion value. Rate refers to the number of bits required for encoding (such as encoding a block, a frame, etc.). Distortion measures the quality loss between, for example, a source image block and a reconstructed version of source video block. In an example, the distortion can be calculated as a sum of absolute differences between pixel values of the image block and the reconstructed version of source video block.

A hypothetical encoder can be used to determine the rate. The hypothetical encoder can carry out the coding steps but does not output bits into a compressed bitstream, such as the compressed bitstream 404 of FIG. 4. The purpose of the hypothetical encoder is to estimate a bitrate (or a simply rate). As such, a hypothetical encoding process may be regarded as, or called, a rate estimation process. The hypothetical encoder can compute an estimate the number of bits required to encode a respective transform block.

As mentioned above, 64 candidate sets can be available. In another example, as also mentioned above, eight candidate sets (i.e., canonical function sets) can be available, and that other candidate sets can be derived using mirroring and/or rotation. In an example, the block can be subjected to orientation and/or mirroring operations resulting in oriented blocks. Each of the oriented blocks can be transformed using the eight canonical sets. In another example, mirroring and/or mirroring can be applied to the canonical sets to obtain the 64 candidate sets and each of the candidate sets is used to transform the block. As such, selecting the set of basis functions for transforming the block to the transform domain can include selecting a candidate set of basis functions for transforming the block, and obtaining the set of basis functions from the candidate set of basis functions using at least one of a rotation or mirroring.

Transforming the block using set of basis functions, for the purpose of selecting the set of basis functions, amounts to taking the inner product of the block with each of the basis functions, as shown in formula (1).

$$c\{B,m\} = \Sigma_{all\ i} E\{B,m;i\} * d\{B,i\} \qquad (1)$$

In formula (1), $c\{B, m\}$ is the transform block of the image block, $d\{B, i\}$; and $E\{B, i\}$ is the ordered list of orthonormal eigenfunctions that corresponds to the boundary(ies) B.

In some implementations, only a subset of the set of basis functions can be used to select the set of basis functions. For example, only the first two of the basis functions corresponding to the lowest energy basis functions are used. For example, the basis function corresponding to the average brightness (such as the basis function 1121 of FIG. 11A) and the basis function illustrated by the split 1120 of FIG. 11A are used. In another example, other subsets can be used. For example, if four basis functions are selected, then the four basis functions corresponding to the lowest energy basis functions are used. As such, selecting the set of basis functions for transforming the block can include selecting, from candidate sets of basis functions, the set of basis functions as an optimal set of basis function by applying, to the block, from each candidate set of basis functions less than all (e.g., at least a subset) of the functions of the candidate set.

At 1406, the process 1400 transforms the block using the set of basis functions to obtain a transform block. The transform block includes transform coefficients. The transform block can be obtained using the formula (1). The transform block is a block of unquantized transform coefficients.

In an example, the unquantized transform coefficients can be scaled and rounded to integer values (i.e., quantized transform coefficients) using a quantization matrix.

It is noted that, for example, as JPEG uses only one set of basis functions, JPEG uses one particular choice of quantization matrix, which indicates how each coefficient is to be scaled prior to rounding the scaled value to an integer.

In implementations according to this disclosure, there can be many different sets of basis functions. As such, instead of using a fixed quantization matrix, each transform coefficient, $c\{B, m\}$ can be scaled according to a function of the corresponding eigenvalue, e{B, m}, of the Laplacian that is associated with the eigenvector. This is so because the eigenvalue is a measure for the characteristic length scale of spatial variations and/or the square of such a length scale. As such, taking quantization into account, and using a quantization function, Q, that provides the scaling factor, the formula (1) can be re-written as formula (1a):

$$c\{B,m\} = \text{roundToInteger}(Q(e\{B,m\} * \Sigma_{all\ i} E\{B,m; i\} * d\{B,i\})) \quad (1a)$$

At 1408, the process 1400 can encode, in the compressed bitstream, an indication of the set of basis functions. In an implementation, encoding the indication of the basis function can include encoding, in the compressed bitstream, a direction of the border and encoding a displacement of the border. The displacement (e.g., the translational shift) corresponding to where the border crosses the block. In an example, each combination of direction and displacement can correspond to a respective index value. As such, and in case of possible 64 combinations, each combination can correspond to an index value of 0 to 63. In another example, where eight directions and eight displacements are possible, a direction index can be 0 to 7 and a displacement index can be 0 to 7. In an implementation, encoding the indication of the basis function can include encoding in the compressed bitstream, a pixel of the block that is on the border and that is closest to an origin of the block. In an example, the (x, y) coordinates of the pixel can be encoded. In another example, a scan order position of the pixel can be encoded. As is known, encoding a transform block uses a scan order to traverse the coefficients of the transform block. As such, the scan order position corresponding to the location of the pixel in the block can be encoded.

In an example, encoding the indication of the set of basis functions can include encoding that the block is split by the border and how the block is split by the border. Encoding that the block is split can require at most one bit. If, for example, only 20% of all the blocks in an image are split, then, on average, much less than one bit may be used to indicate that the block is split. Encoding how the block is split corresponds to encoding which one of the candidate sets (e.g., which one of the 64 candidate sets) is used.

At 1410, the process 1400 encodes the transform block in the compressed bitstream. In an example, encoding the transform block can include quantizing, such as by a quantization unit, the transform block and encoding the quantized transform coefficients. The quantization unit can be the quantization unit 430 of FIG. 4.

In implementations according to this disclosure, an image block that is split into two regions (a first region including only black pixels and a second region including only white pixels) separated by a straight line can be encoded using a first integer in the range 0 . . . 63 that indicates the function-set, a second integer providing the number of non-zero coefficients (here, 2), and a third and a fourth number providing the grayscale values for each of the two different regions. As such, in the case that the block includes two distinct levels of gray (e.g., a black and while block) that are separated by the line, the set of basis functions for transforming the block results in the transform block consisting of no more than two non-zero coefficients. Thus, encoding such block uses significantly fewer bits than those normally required by JPEG. The DCT basis functions of JPEG (shown in FIG. 6) are not tailored to (e.g., cannot deal with) image blocks that are split into distinct regions by a line (or more generally, by a shape). To minimize or eliminate ringing, using JPEG compression, many transform coefficients may need to be encoded.

The process 1400 is described with respect to one block of a frame. In an implementation, the selected set of basis functions for a block of a frame can be used across frames of a sequence of frames or a collection of frames or images. The choice of basis functions for a block can be carried forward into future frames of the collection of frames. In an example, the set of basis functions can be used for co-located blocks of the future frames. In another example, the set of basis functions of a reference block can be used for blocks whose motion vectors refer to the reference block.

FIG. 15 is an example of a flowchart diagram of a process 1500 for decoding a block of a frame according to an implementation of this disclosure. The frame can be a standalone image. The frame can be frame of a video stream. The block can be of any rectangular or square size. For example, the block can be 4×4, 8×8, 12×12, of smaller, or larger size. The block includes pixel values. That is, the block is in the spatial (or pixel) domain. The block can include a shape. The shape can be a border (or line) that splits the blocks into at least two distinct regions. The process 1400 receives a transform block, which is in the frequency domain, and inverse-transforms the transform block to obtain the block, which is in the pixel domain. The transform block includes transform coefficients and can be of the same size as the block.

When inverse-transforming the transform block to the pixel domain, the process 1500 selects a set of basis functions that takes into consideration the shape. For example, in the case of a border, the set of basis functions can take into consideration the orientation of the border and where the border crosses the block. By selecting the set of basis functions considering the border, ringing in the block can be suppressed. In some examples, inverse-transforming the transform block can include de-quantizing the transform block and inverse-transforming the deq-quantized transform block.

The process 1500 can be implemented, for example, as a software program that can be executed by a computing device, such as the computing device 100 of FIG. 1 or one of the computing and communication devices 100A, 100B, 100C of FIG. 2. The software program can include machine-readable instructions (e.g., executable instructions) that can be stored in a memory, such as the memory 110 of FIG. 1, and that can be executed by a processor, such as the processor 120 of FIG. 1, to cause the computing device to perform the process 1500. The process 1500 can be implemented in a decoder, such as the decoder 500 of FIG. 5. In at least some implementations, the process 1500 can be performed in whole or in part by the inverse transform unit 530 of the encoder 500 of FIG. 5.

The process 1500 can be implemented using specialized hardware or firmware. Some computing devices can have multiple memories, multiple processors, or both. The steps or operations of the process 1500 can be distributed using different processors, memories, or both. Use of the terms "processor" or "memory" in the singular encompasses computing devices that have one processor or one memory as well as devices that have multiple processors or multiple memories that can be used in the performance of some or all of the recited steps or operations.

At 1502, the process 1500 decodes, from a compressed bitstream, an indication of a set of basis functions for inverse transforming the block. The indication can be as described with respect to the process 1400. As described above, the set of basis functions corresponds to eigenfunctions (and corresponding eigenvalues) of a graph Laplacian that is formed based on the shape.

In an example, where the shape is a border, decoding the indication of the set of basis functions can include decoding, from the compressed bitstream, a direction of the border; and decoding, from the compressed bitstream, a displacement of the border. In an example, where the shape is a border, decoding the indication of the set of basis functions can include decoding, from the compressed bitstream, a pixel of the block that is on the border and that is closest to an origin of the block. The indication can be used to select the set of basis functions. In an example, a canonical function set is first selected; then, based on the indication, the set of basis functions can be selected (e.g., obtained) by at least one of mirroring or rotation.

At 1504, the process 1500 decodes, from the compressed bitstream, a transform block. The transform block includes transform coefficients. The transform coefficients can be quantized transform coefficients. As such, decoding the transform block can include dequantizing the quantized transform coefficients to obtain the transform block. The dequantizing can be performed by a dequantization unit, such as the dequantization unit 520 of FIG. 5.

At 1506, the process 1500 inverse-transforms the transform block using the set of basis functions to obtain the block. The formula (2) can be used to inverse transform the transform block, $c\{B, m\}$, to obtain the image block, $d\{B, i\}$.

$$d\{B,i\}=\Sigma_{all\ m}E\{B,m;i\}*c\{B,m\} \qquad (2)$$

In an implementation, the inverse-transforming can include dequantizing the transform block before applying the formula 2. A dequantization function that is the inverse of the quantization function, Q, described above can be used. As such, taking dequantization into account, the formula (2) can be rewritten as formula (2a).

$$d\{B,i\}=(\Sigma_{all\ m}E\{B,m;i\}*c\{B,m\})/Q(e\{B,i\}) \qquad (2a)$$

In an implementation, the set of basis functions can be selected from stored candidate sets of basis functions. In another example, the set of basis functions can calculated, such as by an eigenvalue solver, based on indication of the set of basis functions. As mentioned above a graph Laplacian matrix can be formed by disconnecting edges according to the indication and the eigenfunctions obtained.

For ease of understanding, and without limitations, the above described relationship between an image block, the transformed block, and the eigenvectors and eigenvalues, according to implementations of this disclosure, can be further elaborated, in an example, as follows. For purposes of this explanation, the block is assumed to be of size 8×8. However, the disclosure is not so limited.

For a given choice of block-splitting boundary(ies), B, a graph Laplacian that includes more than one connected component is obtained. The associated graph Laplacian is a matrix that depends on B. Let $L\{B\}$ denote the graph Laplacian matrix. The graph Laplacian matrix, $L\{B\}$, is a real symmetric matrix. Hence it is also Hermitian matrix, which means that all its eigenvalues are real. There are as many eigenvalues as there are pixels in the block. However, in some situations (such as, for example, in the case of a symmetric split of an 8×8 graph into two 4×8 pieces), some of the eigenvalues can occur more than once.

The eigenvalues and eigenvectors also depend on the block-splitting boundary(ies) B. The 8×8 eigenvalues are denoted $e\{B, i\}$; and the associated eigenvectors are denoted $E\{B, i\}$. As such, the eigenvalue condition can be given by equation (3)

$$L\{B\}E\{B,i\}=e\{B,i\}E\{B,i\} \qquad (3)$$

If the sign of $L\{B\}$ is such that the diagonal entries of $L\{B\}$ are non-negative, then the eigenvalues will be non-negative. The other sign choice results in non-positive eigenvalues. Also, eigenfunctions for different eigenvalues will automatically be orthogonal with respect to the standard scalar product on 8×8-dimensional vectors. It is noted that all eigenvectors only have real entries.

For a graph with K connected components, the eigenvalue 0 can be expected to be found K times. This corresponds to the space of functions that are constant on each graph component. For K components, K such functions (i.e., indicator functions) that are independent can be selected. As a basis for the corresponding linear space of eigenfunctions, the K indicator functions of the connected components can be selected, suitably re-scaled to have length-1 with respect to the standard scalar product. The indicator function of a component can take on the value of 1 on all the nodes that belong to the component, and 0 on all other nodes.

For every possible choice of the boundary(ies), B, the eigenfunctions $E\{B, i\}$ can be ordered. No specific order may be necessary. However, an encoder and a decoder must have the same ordering. In an example, the order can be achieved by sorting the eigenfunctions $E\{B, i\}$ by increasing magnitude of the associated eigenvalue $e\{B, i\}$.

Whenever there is a degeneracy among eigenvalues (such as when $e\{B, i\}=e\{B, j\}$ for $i\ !=j$, so always for the $e\{B, i\}=0$ eigenvalues), and for some splits (typically, for symmetric splits), the corresponding set of all eigenfunctions that are associated with the degenerate eigenvalue span a linear space. As such, it may be necessary that an encoder and a decoder use the same vector space basis for these higher-dimensional vector spaces. This can be ensured, for example, by either hard-coding the rules that determine the basis for such a vector space in a compatible way in both the encoder and the decoder, or by using a shared pre-computed set of basis functions. However, as described above, using slightly distorted edge-strengths can eliminate the degeneracy for all eigenfunctions except for the zero eigenvalues.

When slightly changing edge weights, it may be important to ensure that the 'forward' and 'backward' direction use the same weight, and that the diagonal entries in the Laplace matrix are such that the numbers in each row sum to zero. For example, if the matrix L has an entry of 1.0051 at (3, 5), then the entry at (5, 3) must also be 1.0051. A different edge would then use a different pseudorandom number.

Both the encoder and the decoder can use basis functions that are obtained by a specific (e.g., the same) eigenvalue algorithm. In an implementation, a QR-decomposition-based eigenvalue algorithm can be used. However, other algorithms are possible. In particular, eigenfunctions are only determined up to an overall factor of −1. It must be ensured that both encoder and decoder use the same signs.

As described above, the eigenspace for eigenvalue 0 is special as it contains the DC basis function. A convention can be used to ensure that the very first basis function is constantly 1 on all nodes. A deterministic algorithm can be used to obtain a complete orthonormal basis for that space. In an example, a basic basis exchange algorithm can be used. However, any other deterministic algorithm can also be used.

Once the B-dependent (i.e., boundary(ies)-dependent) choice on an ordered list of orthonormal eigenfunctions E{B, i} is obtained, the coefficients c{B, m} of the transformed block are obtained from the entries of the image data block, d{B, n} using the formula (1), which is repeated herein for convenience:

$$c\{B,m\} = \Sigma_{all\ i} E\{B,m;i\} * d\{B,i\} \qquad (1)$$

That is, for 8×8 blocks, each of the 64 E{B, i} for i=0, 1, . . . 63 eigenvectors is a vector of 64 real numbers. In order to find the $m^{th}$ coefficient c{B, m}, the scalar product of the $m^{th}$ eigenvector E{B, m} with the vector of 64 image-coefficients, listed in node order, is obtained using the formula 1.

To obtain the image data (i.e., d{B, i}) from the transform block (i.e., from the transform coefficients), formula (2), which is reproduced here for convenience, can be used.

$$d\{B,i\} = \Sigma_{all\ m} E\{B,m;i\} * c\{B,m\} \qquad (2)$$

The transform coefficients, c{B, m}, may be scaled and rounded (i.e., quantized) to integer values. The mentioned above, a quantization function can also be used as described with respect to formulae (1a) and (2a).

As mentioned above, implementations according to this disclosure use fewer bits for coding the transform coefficients than other schemes at least because fewer or no coefficients are required to suppress ringing.

A concrete example is now provided with respect to the coding of a 500×400 pixel image (e.g., frame) whereby the coding includes dividing the image 8×8 blocks, which are coded separately. Since 500 is not a multiple of eight, there would be 4×8 blocks at the right border. Each 4×8 block may be enlarged into an 8×8 block by padding with black pixel values. After decoding, the padded half of the block may be cut off.

Encoding such a half-black 8×8 block with conventional encoding techniques may require using 128 bits or so for the entire block. A substantial number of the bits may be required to suppress ringing near the borders of the block: on the visible side (i.e., the right edge of the 4×8 block) as well as on the ignorable side (i.e., the right edge 8×8 block). If some of the coefficients were to be dropped, ringing artefacts may be visible to the left of the right edge of the 4×8 block as well as on the to-be-thrown-away part (i.e., the padded 4×8 part).

However, such extended (i.e., padded) block can be encoded, according to implementations of this disclosure, as a split block with a vertical line running through the middle, where the right half of the block is black (i.e., only includes black pixel values).

According to implementations of this disclosure, if the visible half-block (i.e., the original 4×8 image block) has interesting structure, no more than 128/2=64 bits may be required for coefficients to encode the image content. As such, in the case that 64 sets of basis functions are used, thereby requiring no more than 6 extra bits to encode the split, 70 (=64+6) bits may be required in total to encode the 4×8 block, as compared to the 128 or so bits for a more conventional approach.

For simplicity of explanation, the processes 1400 and 1500 are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms, and/or instructions described herein. In addition, or alternatively, for example, a special-purpose computer/processor, which can contain specialized hardware for carrying out any of the methods, algorithms, or instructions described herein, can be utilized.

The transmitting computing and communication device 100A and the receiving computing and communication device 100B can, for example, be implemented on computers in a real-time video system. Alternatively, the transmitting computing and communication device 100A can be implemented on a server, and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method for encoding a block of a frame, the method comprising:
   receiving the block, wherein the block is in a spatial domain;
   selecting, based on a direction and crossing location of a border that crosses the block, a set of basis functions for transforming the block to a transform domain,
       wherein the set of basis functions is selected from a set of candidate sets of basis functions, and
       wherein each candidate set of basis functions corresponds to a respective direction of a block-crossing border of a to-be-encoded block and a respective displacement of the block-crossing border within the to-be-encoded block;
   transforming the block using the set of basis functions to obtain a transform block;
   encoding, in a compressed bitstream, an indication of the set of basis functions; and
   encoding, in the compressed bitstream, the transform block.

2. The method of claim 1, wherein selecting, based on the border that crosses the block, the set of basis functions for transforming the block to the transform domain comprises:
   selecting the set of basis functions as an optimal set of basis functions from amongst the set of candidate sets of basis functions by applying, to the block, from each of the candidate sets of basis functions at least a subset of the basis functions of the candidate set.

3. The method of claim 1, wherein selecting, based on the border that crosses the block, the set of basis functions for transforming the block to the transform domain comprises:
   selecting a candidate set of basis functions for transforming the block; and
   obtaining the set of basis functions from the candidate set of basis functions using at least one of a rotation or mirroring of the border.

4. The method of claim 1, further comprising:
   forming, based on the block, a connected graph,
       wherein each pixel of the block is represented by a node in the connected graph, and
       wherein each node of the connected graph is connected by respective edges to neighbors of the node;
   disconnecting, to obtain a second graph, edges of the connected graph based on the border; and
   determining the set of basis functions as a set of eigenvectors with associated eigenvalues of the second graph.

5. The method of claim 1, wherein in a case that the block constitutes two different gray levels, the set of basis functions for transforming the block results in the transform block consisting of no more than two non-zero coefficients.

6. The method of claim 1, wherein encoding in the compressed bitstream, the indication of the set of basis functions comprising:
   encoding, in the compressed bitstream, a direction of the border; and
   encoding, in the compressed bitstream, a displacement of the border.

7. The method of claim 1, wherein encoding in the compressed bitstream, the indication of the set of basis functions comprising:
   encoding, in the compressed bitstream, a pixel of the block that is on the border and that is closest to an origin of the block.

8. The method of claim 1, wherein the set of basis functions for transforming the block to the transform domain is selected from based on eight canonical basis functions sets.

9. The method of claim 1, wherein the set of basis functions for transforming the block to the transform domain is selected from a set comprising 64 candidate basis functions sets.

10. The method of claim 1, wherein the border is a coordinate-parallel line.

11. An apparatus for encoding a block of a frame, the apparatus comprising:
    a processor configured to:
        receive the block, wherein the block is in a spatial domain;
        select, based on a shape that partitions the block, a set of basis functions for transforming the block to a transform domain,
            wherein the set of basis functions is selected from a set of candidate sets of basis functions, and
            wherein each of at least some of the candidate sets of basis functions corresponds to a respective direction of a block-crossing shape of a to-be-encoded block and a respective displacement of the block-crossing shape within the to-be-encoded block;
        transform the block using the set of basis functions to obtain a transform block;
        encode, in a compressed bitstream, an indication of the set of basis functions; and encode, in the compressed bitstream, the transform block.

12. The apparatus of claim 11, wherein to select the set of basis functions for transforming the block to the transform domain comprises to:
apply, to the block, from each candidate set of basis functions at least a subset of all functions of the candidate set.

13. The apparatus of claim 11, wherein to select the set of basis functions for transforming the block to the transform domain comprises to:
select a candidate set of basis functions for transforming the block; and
obtain the set of basis functions from the candidate set of basis functions using at least one of a rotation or mirroring of the shape.

14. The apparatus of claim 11, wherein the processor further configured to:
form, based on the block, a connected graph,
wherein each pixel of the block is represented by a node in the connected graph, and
wherein each node of the connected graph is connected by respective edges to neighbors of the node;
disconnect edges of the connected graph based on the shape, resulting in a modified graph; and
determine the set of basis functions as a set of eigenvectors with associated eigenvalues of the modified graph.

15. The apparatus of claim 11, wherein the shape is one of a border, a quadric, or a corner.

16. The apparatus of claim 15, wherein the shape is the border, and wherein to encode in the compressed bitstream, the indication of the set of basis functions comprises to:
encode, in the compressed bitstream, a direction of the border; and
encode, in the compressed bitstream, a displacement of the border.

17. The apparatus of claim 15, wherein to encode in the compressed bitstream, the indication of the set of basis functions comprises to:
encode, in the compressed bitstream, a pixel of the block that is on the border and that is closest to an origin of the block.

18. An apparatus for decoding a block of a frame, the apparatus comprising:
a processor configured to:
decode, from a compressed bitstream, an indication of a set of basis functions for inverse transforming a transform block of the block,
wherein the set of basis functions is one of a set of available candidate sets of basis functions, each available candidate set of at least some of the available candidate sets corresponds to a respective displacement of a shape and a respective direction of the shape within the block;
wherein the block includes a shape,
wherein the set of basis functions corresponds to the shape; and
wherein the set of basis functions corresponds to eigenfunctions of a graph Laplacian that is formed based on the shape;
decode, from the compressed bitstream, the transform block; and
inverse-transform the transform block using the set of basis functions to obtain the block.

19. The apparatus of claim 18, wherein the shape is a border and wherein to decode, from the compressed bitstream, the indication of the set of basis functions comprises:
decode, from the compressed bitstream, a direction of the border; and
decode, from the compressed bitstream, a displacement of the border.

20. The apparatus of claim 18, wherein the shape is a border and wherein to decode, from the compressed bitstream, the indication of the set of basis functions comprises:
decode, from the compressed bitstream, a pixel of the block that is on the border and that is closest to an origin of the block.

* * * * *